US012724360B2

(12) United States Patent
Fujisaki et al.

(10) Patent No.: US 12,724,360 B2
(45) Date of Patent: Sep. 1, 2026

(54) IMAGE FORMING APPARATUS

(71) Applicants: Manabu Fujisaki, Kanagawa (JP); Eiji Tsuchida, Kanagawa (JP); Ryoma Ikemoto, Kanagawa (JP)

(72) Inventors: Manabu Fujisaki, Kanagawa (JP); Eiji Tsuchida, Kanagawa (JP); Ryoma Ikemoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 19/210,254

(22) Filed: May 16, 2025

(65) Prior Publication Data

US 2025/0377612 A1 Dec. 11, 2025

(30) Foreign Application Priority Data

Jun. 6, 2024 (JP) ................................ 2024-092379

(51) Int. Cl.
*G03G 15/08* (2006.01)
*G03G 15/00* (2006.01)
(Continued)

(52) U.S. Cl.
CPC ..... *G03G 15/0858* (2013.01); *G03G 15/0856* (2013.01); *G03G 15/0896* (2013.01); *G03G 15/105* (2013.01); *G03G 15/55* (2013.01); *G03G 15/553* (2013.01); *G03G 15/556* (2013.01); *G03G 21/1676* (2013.01);
(Continued)

(58) Field of Classification Search
CPC ........... G03G 15/0856; G03G 15/0896; G03G 15/105; G03G 15/55; G03G 15/553; G03G 15/556; G03G 15/0858; G03G 15/086; G03G 21/1676; G03G 21/1867; G03G 21/1885; G03G 21/1889; G03G 2215/00637; G03G 2215/0665;
(Continued)

(56) References Cited

U.S. PATENT DOCUMENTS 7,110,917 B2 * 9/2006 Matsuura .............. G06F 11/008 358/1.14
2007/0182419 A1 * 8/2007 Ushijima ........... G03G 15/5037 324/457
(Continued)

FOREIGN PATENT DOCUMENTS

JP 2021-096428 A 6/2021
JP 2025-002168 A 1/2025

*Primary Examiner* — Joseph S Wong
(74) *Attorney, Agent, or Firm* — IPUSA, PLLC

(57) ABSTRACT

An image forming apparatus includes a toner container housing, an image forming device, a tuning fork, a vibration generator, a communication circuit, and a terminal. The toner container housing houses a toner bottle storing toner. The toner bottle includes an electrode on a surface of the toner bottle. The image forming device receives the toner in the toner bottle to form a toner image. The vibration generator vibrates the tuning fork. The communication circuit is electrically connected to the tuning fork. The terminal is coupled to the tuning fork and is contactable with the electrode to electrically connect the communication circuit and the electrode of the toner bottle in the toner container housing via the tuning fork. The vibration generator vibrates the tuning fork to vibrate the terminal contacting the electrode.

8 Claims, 12 Drawing Sheets

(51) Int. Cl.
*G03G 15/10* (2006.01)
*G03G 21/16* (2006.01)
*G03G 21/18* (2006.01)

(52) U.S. Cl.
CPC ..... *G03G 21/1867* (2013.01); *G03G 21/1885* (2013.01); *G03G 21/1889* (2013.01); *G03G 2215/00637* (2013.01); *G03G 2215/0665* (2013.01); *G03G 2215/0678* (2013.01); *G03G 2221/0021* (2013.01); *G03G 2221/1823* (2013.01)

(58) Field of Classification Search
CPC ... G03G 2215/0678; G03G 2221/0021; G03G 2221/1823
See application file for complete search history.

(56) References Cited

U.S. PATENT DOCUMENTS

| | | | | |
|---|---|---|---|---|
| 2008/0150543 | A1* | 6/2008 | Masubuchi ........ | G03G 15/5008 324/452 |
| 2019/0163112 | A1 | 5/2019 | Nikaku et al. | |
| 2019/0166275 | A1 | 5/2019 | Ishii et al. | |
| 2019/0238702 | A1 | 8/2019 | Ikemoto et al. | |
| 2019/0238717 | A1 | 8/2019 | Inage et al. | |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2024-092379, filed on Jun. 6, 2024, in the Japan Patent Office, the entire disclosure of which is hereby incorporated by reference herein.

BACKGROUND

Technical Field

The present disclosure relates to an image forming apparatus.

Related Art

A technique has been proposed that a toner remaining amount in a toner container in an image forming apparatus is detected. In order to detect the toner remaining amount in the toner container, a configuration has been proposed in which parallel plate electrodes are disposed up and down, and left and right of the toner container to detect the remaining amount of the toner in the toner container by capacitance.

SUMMARY

The present disclosure described herein provides an image forming apparatus that includes a toner container housing, an image forming device, a tuning fork, a vibration generator, a communication circuit, and a terminal. The toner container housing houses a toner bottle storing toner. The toner bottle includes an electrode on a surface of the toner bottle. The image forming device receives the toner in the toner bottle to form a toner image. The vibration generator vibrates the tuning fork. The communication circuit is electrically connected to the tuning fork. The terminal is coupled to the tuning fork and is contactable with the electrode to electrically connect the communication circuit and the electrode of the toner bottle in the toner container housing via the tuning fork. The vibration generator vibrates the tuning fork to vibrate the terminal contacting the electrode.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
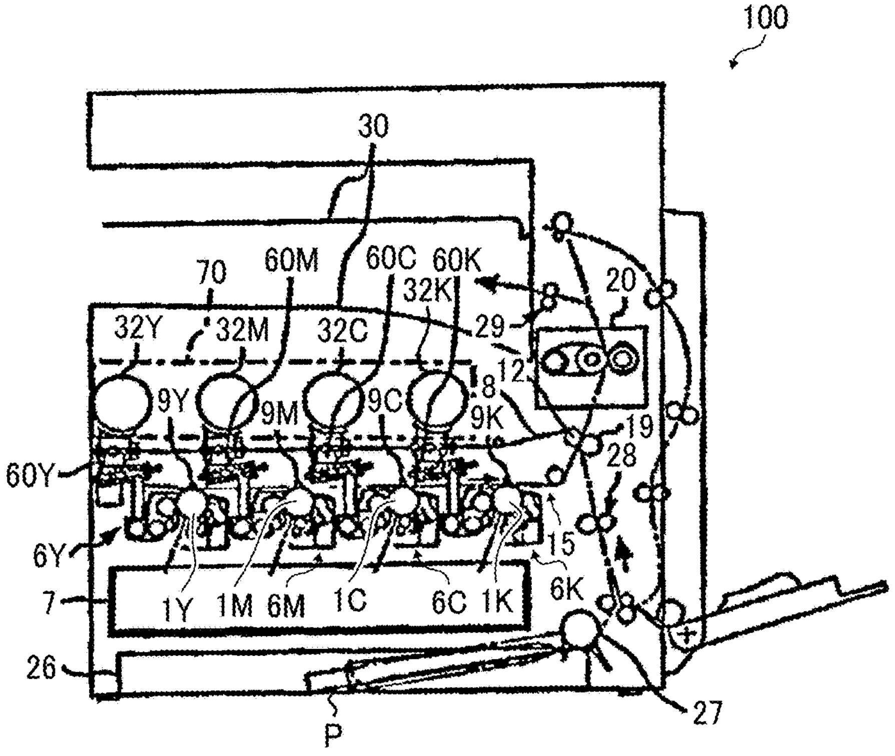
FIG. 1 is a diagram illustrating an overall configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. In order to facilitate the understanding of the description, like reference signs denote like elements in the drawings, and overlapping description may be simplified or omitted as appropriate. As used herein, the singular forms "a," "an," and "the" are intended to include the plural forms as well, unless the context clearly indicates otherwise.

An image forming apparatus 100 according to the embodiment includes a toner remaining amount detector 200 that detects a remaining amount of toner in a toner container 32.

Figure 2:
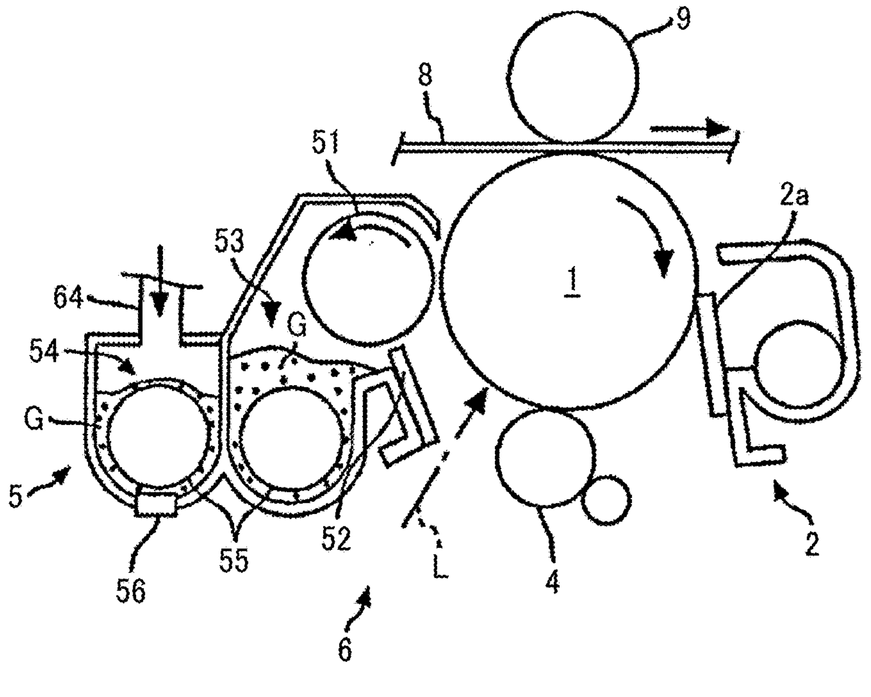
FIG. 2 is a diagram illustrating an image forming device of the image forming apparatus of FIG. 1.

With reference to FIGS. 1 and 2, a description is given of a basic configuration of the image forming apparatus 100 according to an embodiment of the present disclosure.

FIG. 1 is a diagram illustrating an overall configuration of the image forming apparatus 100. As illustrated in FIG. 1, the image forming apparatus 100 includes a toner container mount 70, an intermediate transfer unit 15, an image forming device 6, and a toner supply device 60. Four toner containers 32 (Y, M, C, and K) corresponding to the respective colors (yellow, magenta, cyan, and black) are removably (replaceably) installed in the toner container mount 70.

In FIG. 1, the intermediate transfer unit 15 is disposed below the toner container mount 70. Four image forming devices 6Y, 6M, 6C, and 6K corresponding to colors of yellow, magenta, cyan, and black, respectively, are arranged side by side to face an intermediate transfer belt 8 of the intermediate transfer unit 15.

The toner supply devices 60 (Y, M, C, and K) are disposed below the toner containers 32 (Y, M, C, and K), respectively. Toners contained in the toner containers 32 (Y, M, C, and K) are supplied (replenished) into developing devices 5 (see FIG. 2) of the image forming devices 6 (Y, M, C, and K) by the toner supplying devices 60 (Y, M, C, and K), respectively.

Four toner containers 32Y, 32M, 32C, and 32K, the four image forming devices 6Y, 6M, 6C, and 6K, and four toner supply devices 60Y, 60M, 60C, and 60K have similar configurations except for the color of toner used therein. Accordingly, in the description and drawings below, the suffixes Y, M, C, and K, each representing the color of toner to be used, are appropriately omitted.

FIG. 2 is a diagram illustrating a configuration of the image forming device 6 according to the present embodiment. FIG. 2 illustrates the configuration of one of the four image forming devices 6 in FIG. 1.

The image forming device 6 includes a photoconductor 1, a charging device 4 disposed around the photoconductor 1, the developing device 5, a cleaning device 2, and a charge eliminating device. Image forming processes, that is, a charging process, an exposure process, a development process, a transfer process, and a cleaning process are performed on the photoconductor 1, and thus a toner image of each color is formed on the photoconductor 1.

A drive motor drives to rotate the photoconductor 1 in a direction indicated by the arrow (clockwise) in FIG. 2. At the position of the charging device 4, a surface of the photoconductor 1 is uniformly charged (charging process). When the surface of the photoconductor 1 reaches a position where the surface of the photoconductor 1 is irradiated with a laser beam L emitted from an exposure device 7 (see FIG. 1), the photoconductor 1 is scanned with the laser beam L, and thus, an electrostatic latent image for each color is formed thereon (exposure process).

After the exposure process, the surface of the photoconductor 1 reaches a position opposite the developing device 5, where the electrostatic latent image is developed with toner into the toner image for each color (development process). At a primary transfer position at which the photoconductor 1 is opposed to a primary transfer roller 9 via the intermediate transfer belt 8, the toner image on the photoconductor 1 is transferred onto the intermediate transfer belt 8 (primary transfer process). The respective toner images formed on the photoconductors 1Y, 1M, 1C, and 1K (see FIG. 1) are sequentially transferred to and superimposed on the intermediate transfer belt 8, thereby forming a multicolor toner image on the intermediate transfer belt 8.

After the primary transfer process, a certain amount of untransferred toner remains on the surface of the photoconductor 1. When the surface of the photoconductor 1 reaches a position opposite the cleaning device 2, a cleaning blade 2*a* of the cleaning device 2 mechanically collects the untransferred toner remaining on the photoconductor 1 (cleaning process). Subsequently, the surface of the photoconductor 1 reaches a position opposite the charge eliminating device, and the charge eliminating device removes any residual potential on the photoconductor 1.

With reference to FIG. 1, the intermediate transfer unit 15 includes the intermediate transfer belt 8, four primary transfer rollers 9Y, 9M, 9C, and 9K, a secondary transfer backup roller 12, multiple tension rollers, and an intermediate-transfer-belt cleaner. The intermediate transfer belt 8 is stretched around and supported by the multiple tension rollers and is rotated in the direction of the arrow (counterclockwise) illustrated on the intermediate transfer belt 8 in FIG. 1 as the secondary transfer backup roller 12, which is one of the multiple tension rollers, rotates. The four primary transfer rollers 9Y, 9M, 9C, and 9K press against the corresponding photoconductors 1Y, 1M, 1C, and 1K (also collectively referred to as the "photoconductors 1") via the intermediate transfer belt 8, thereby forming primary transfer nips between the primary transfer rollers 9Y, 9M, 9C, and 9K and the corresponding photoconductors 1Y, 1M, 1C, and 1K.

A primary transfer bias opposite in polarity to toner is applied to the primary transfer rollers 9Y, 9M, 9C, and 9K. The intermediate transfer belt 8 travels in the direction of the arrow illustrated on the intermediate transfer belt 8 in FIG. 1, and sequentially passes through the primary transfer nips of the primary transfer rollers 9Y, 9M, 9C, and 9K. Thus, the single-color toner images on the respective photoconductors 1Y, 1M, 1C, and 1K are primarily transferred to and superimposed on the intermediate transfer belt 8, thereby forming a multicolor toner image.

The intermediate transfer belt 8 onto which the toner images of the respective colors are transferred and superimposed reaches a secondary transfer position opposite a secondary transfer roller 19. The secondary transfer backup roller 12 and the secondary transfer roller 19 press against each other via the intermediate transfer belt 8, and the contact portion therebetween is referred to as a secondary transfer nip. The multicolor toner image on the intermediate transfer belt 8 is transferred onto a recording medium P such as a transfer sheet conveyed to the secondary transfer nip (secondary transfer process).

After the secondary transfer process, a certain amount of untransferred toner, which is not transferred onto the recording medium P, remains on the intermediate transfer belt 8. When the intermediate transfer belt 8 reaches a position opposite the intermediate-transfer-belt cleaner, the untransferred toner is collected from the intermediate transfer belt 8 by the intermediate-transfer-belt cleaner. Thus, a series of transfer processes performed on the intermediate transfer belt 8 ends.

The recording medium P is conveyed from a sheet feeder 26 disposed in a lower portion of the image forming apparatus 100 to the secondary transfer nip via, for example, a feed roller 27 and a registration roller pair 28. Specifically, the sheet feeder 26 stores a stack of multiple recording media P such as sheets of paper stacked on one on another. As the feed roller 27 rotates counterclockwise in FIG. 1, the feed roller 27 feeds a top recording medium P of the stack of multiple recording media P in the sheet feeder 26 to a roller nip between the registration roller pair 28.

The registration roller pair 28 stops rotating temporarily, stopping the recording medium P with a leading end of the recording medium P nipped in the registration roller pair 28. Then, the registration roller pair 28 rotates to convey the recording medium P to the secondary transfer nip such that the recording medium P timely meets the multicolor toner image on the intermediate transfer belt 8. Thus, the desired color image is transferred onto the recording medium P.

The recording medium Ponto which the multicolor toner image is transferred at the secondary transfer nip is conveyed to a fixing device 20. In the fixing device 20, a fixing belt and a pressure roller apply heat and pressure to the recording medium P to fix the multicolor toner image on the recording medium P.

Subsequently, the recording medium Pis conveyed through the rollers of an output roller pair 29 and ejected to the outside of the image forming apparatus 100. The recording media P ejected by the output roller pair 29 to the outside of the image forming apparatus 100 are sequentially stacked as output images on a stack tray 30. Thus, a series of image forming processes performed by the image forming apparatus 100 is completed.

Next, a configuration and operation of the developing device 5 in the image forming device 6 are described in further detail below.

As illustrated in FIG. 2, the developing device 5 includes a developing roller 51 facing the drum-shaped photoconductor 1, a doctor blade 52 facing the developing roller 51, and two conveying screws 55 disposed in a first developer housing 53 and a second developer housing 54. The developing device 5 further includes a toner concentration sensor 56 that detects the toner concentration in the developer in the first developer housing 53.

The developing roller 51 includes magnets and a sleeve. The magnets are fixed inside the developing roller 51. The sleeve rotates around the magnets. The first developer housing 53 and the second developer housing 54 contain the two-component developer G including carrier and toner. The second developer housing 54 communicates, via an opening on an upper side thereof, with a downward toner conveyance passage 64.

The sleeve of the developing roller 51 is driven to rotate in the direction indicated by the arrow (counterclockwise direction) illustrated on the developing roller 51 in FIG. 2. The developer G is borne on the developing roller 51 by a magnetic field generated by the magnets. As the sleeve rotates, the developer G moves along the circumference of the developing roller 51.

The percentage (concentration) of toner in the developer G (ratio of toner to carrier) in the developing device 5 is adjusted within a specified range. The toner stored in the toner container 32 illustrated in FIG. 1 is supplied into the second developer housing 54 through the toner supply device 60 illustrated in FIG. 1 according to the consumption of the toner in the developing device 5.

The two conveying screws 55 stir and mix the developer G with toner supplied to the second developer housing 54 while circulating the developer G in the first developer housing 53 and the second developer housing 54. The toner in the developer G is electrically charged by friction together with the carrier and thus is attracted to the carrier. Both the toner and the carrier are borne on the developing roller 51 due to a magnetic force generated on the developing roller 51. The developer G borne on the developing roller 51 is conveyed in the direction of the arrow on the developing roller 51 illustrated in FIG. 2, and reaches the position of the doctor blade 52.

An amount of developer G on the developing roller 51 is adjusted by the doctor blade 52 at this position. Then, the developer G is carried to the point opposite the photoconductor 1 (a development area). Toner in the developer G is attracted to the latent image formed on the photoconductor 1 due to an electric field generated in the development area. Subsequently, as the sleeve rotates, the developer G remaining on the developing roller 51 reaches an upper portion of the first developer housing 53 and separates from the developing roller 51 at this position.

In FIG. 1, the toner container 32 is illustrated in a circular shape for convenience of illustration, but the shape of the toner container 32 installed in the image forming apparatus 100 according to the present embodiment is not limited thereto. For example, as described later, an element having any shape or type, such as a toner cartridge or a toner bottle, can be applied as the toner container 32.

As described above, the image forming apparatus 100 according to the present embodiment includes the toner remaining amount detector 200 for detecting the toner remaining amount in the toner container 32. The toner remaining amount detector 200 according to the present embodiment includes a tuning fork 210 installed to receive a load from the toner container 32, and estimates the toner remaining amount based on the vibration frequency at which the tuning fork 210 resonates with the toner container 32. In the following description, the vibration frequency of the tuning fork 210 generated in this way may be referred to as a "resonance frequency". The toner remaining amount detector 200 can be mounted as a part of the toner supply device 60 illustrated in FIG. 1 described above. In this case, the toner supply device 60 controls the amount of toner supplied to the image forming device 6 using information on the toner remaining amount detected by the toner remaining amount detector 200.

A description is given of the toner remaining amount detector 200 according to the present embodiment with reference to FIGS. 3 to 9.

In the following description, an X direction, a Y direction, and a Z direction are perpendicular to each other. The X direction is the axial direction of a toner bottle 32B and an insertion-and-removal direction into and from the toner container mount 70. The Y direction is the direction in which the tuning forks 210, terminals 261, and electrodes 32B6 are arranged. The Z direction is a stacking direction of the respective elements of the toner remaining amount detector 200 such as the tuning forks 210, the terminals 261, and the electrodes 32B6.

Figure 3:
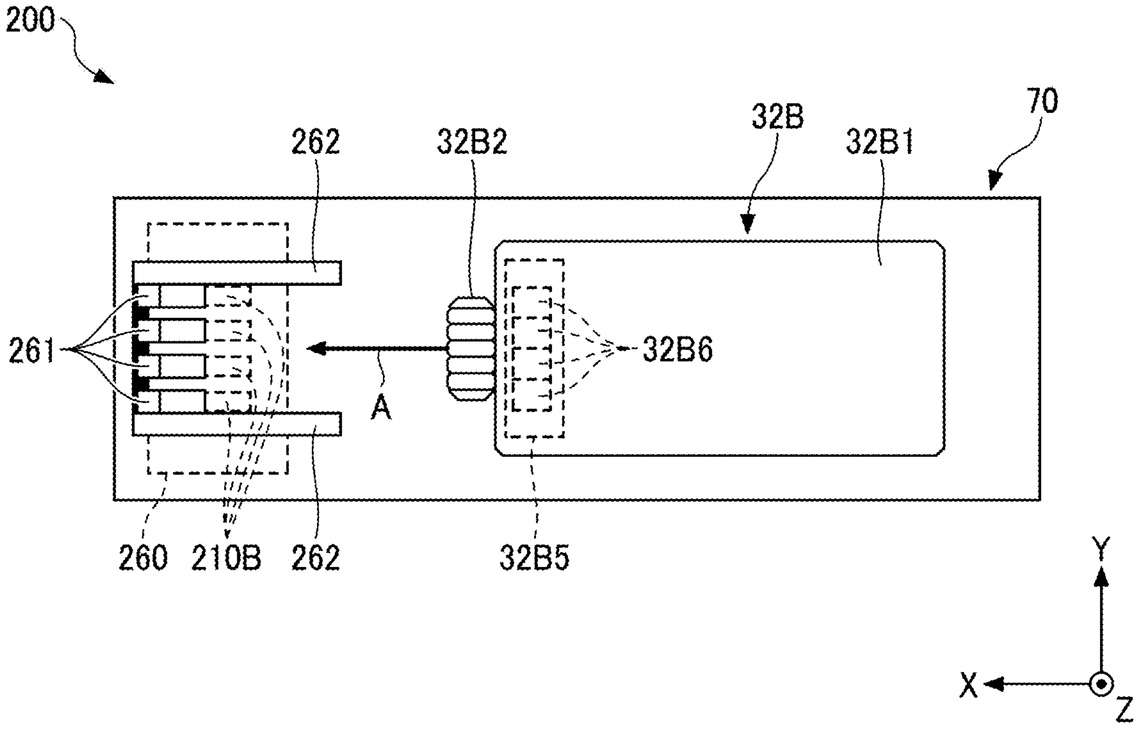
FIG. 3 is a plan view of a toner remaining amount detector according to the present embodiment.
Figure 4:
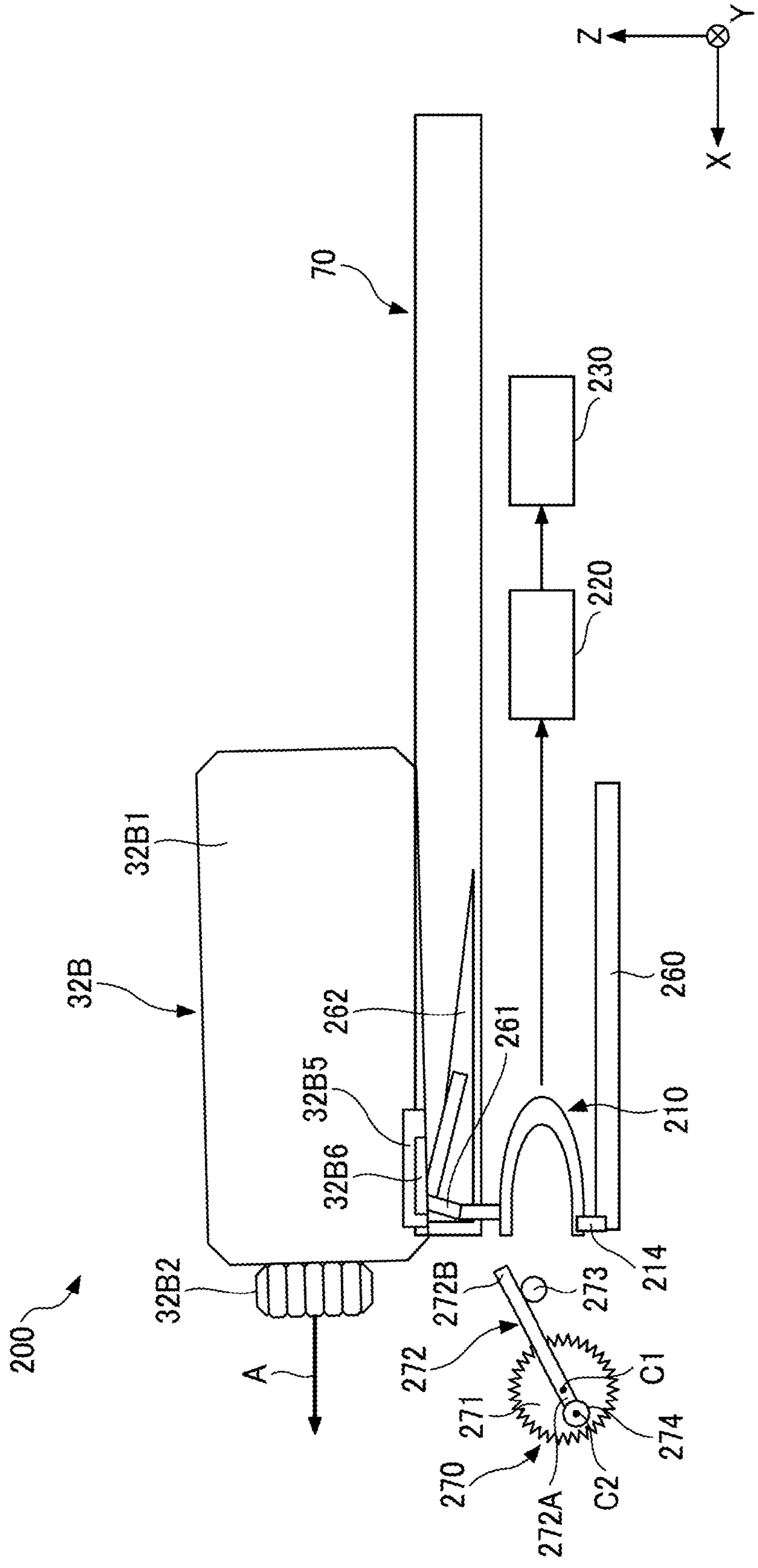
FIG. 4 is a side view of a toner remaining amount detector according to the present embodiment.
Figure 5:
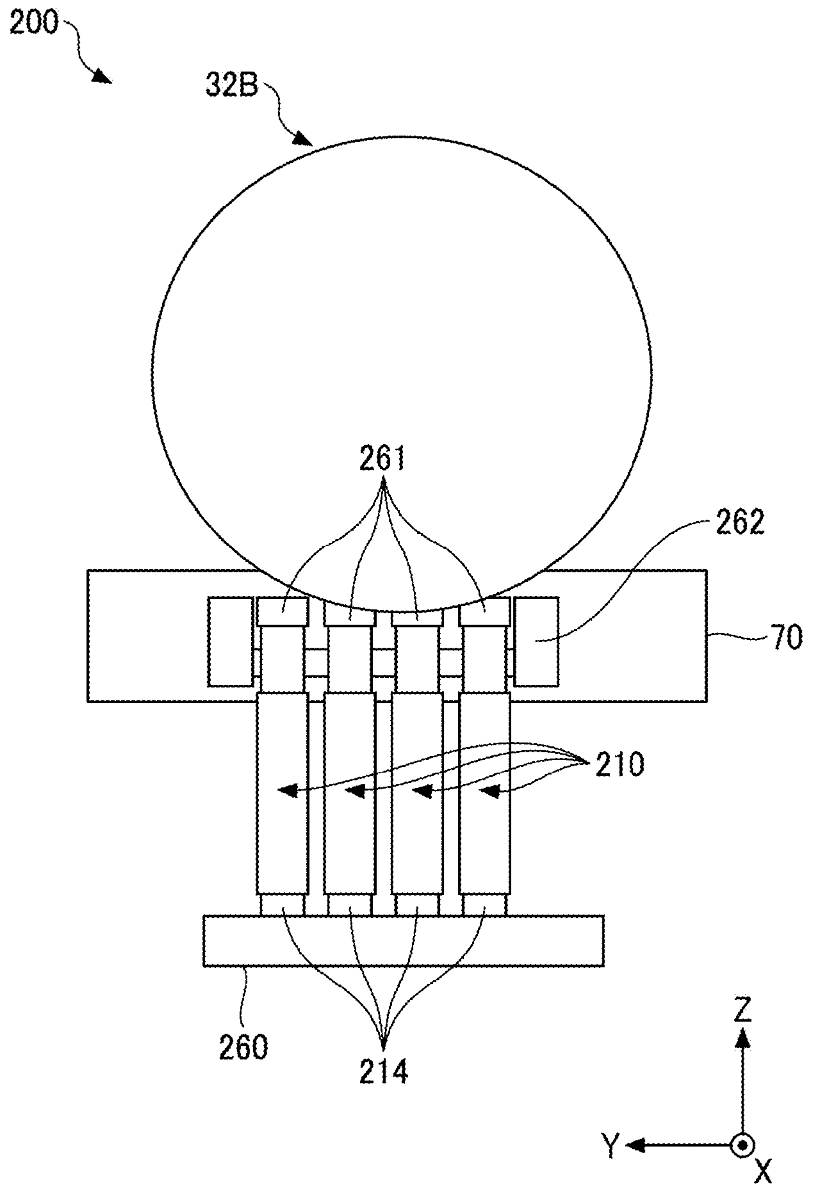
FIG. 5 is a front view of a toner remaining amount detector according to the present embodiment.

FIG. 3 is a plan view of the toner remaining amount detector 200 according to the present embodiment. FIG. 4 is a side view of the toner remaining amount detector 200 according to the present embodiment. FIG. 5 is a front view of the toner remaining amount detector 200 according to the present embodiment.

As illustrated in FIGS. 3 to 5, in the image forming apparatus 100 according to the present embodiment, the toner bottle 32B is used as a toner container in which the toner remaining amount is detected by the toner remaining amount detector 200. The toner bottle 32B includes a cylindrical and hollow body of the toner bottle 32B1 and a discharge port 32B2 disposed at one end in the axial direction (the +X direction in the examples of FIGS. 3 to 5) of a body of the toner bottle 32B1. The discharge port 32B2 has a columnar shape having a diameter smaller than the body of the toner bottle 32B1, and is disposed to protrude from one end of the body of the toner bottle 32B1 in the axial direction to be coaxial with the body of the toner bottle 32B1.

As indicated by arrows A in FIGS. 3 and 4, in the image forming apparatus 100 according to the embodiment, the toner bottle 32B as an example of the toner container 32 is moved from the −X direction to the +X direction to be inserted and installed in the toner container mount 70. The toner bottle 32B is moved in the −X direction to be pulled out and removed from the toner container mount 70.

An identification (ID) substrate 32B5 is disposed in the toner bottle 32B. The ID substrate 32B5 stores unique information (for example, a model number, a manufacturer, and a date of manufacture) of the toner bottle 32B. The electrodes 32B6 are electrically connected to the ID substrate 32B5. The electrodes 32B6 are disposed on the surface of the toner bottle 32B and are exposed outside. In the present embodiment, the electrodes 32B6 are disposed to face the lower portion of the toner bottle 32B when the toner bottle 32B is stored in the toner container mount 70.

The image forming apparatus 100 includes a communication circuit 260 and the terminals 261. The communication circuit 260 communicates information with the toner bottle 32B. For example, the communication circuit 260 acquires the unique information from the ID substrate 32B5 on the toner bottle 32B. The terminals 261 are connected to the communication circuit 260 and contacts the electrodes 32B6 on the toner bottle 32B to electrically connect the ID substrate 32B5 of the toner bottle 32B and the communication circuit 260.

As illustrated in FIG. 4, the electrodes 32B6 are arranged at positions where the electrodes 32B6 contact the electrodes 32B6 on the toner bottle 32B when the toner bottle 32B is disposed at a specified position in the toner container mount 70. As illustrated in FIGS. 3 and 5, in the present embodiment, four terminals 261 and four electrodes 32B6 are disposed, and the terminals 261 are arranged along the Y direction to contacts any one of the four electrodes 32B6.

As illustrated in FIG. 3, a guide 262 is disposed in the toner container mount 70 of the image forming apparatus 100. For example, as illustrated in FIG. 3, the guide 262 includes a pair of members disposed on the outside of the four terminals 261 in the +Y direction and in the −Y direction. A pair of guides 262 are disposed in this way, such that the electrodes 32B6 can be aligned with the terminals 261 in the Y direction when the toner bottle 32B is inserted into the toner container mount 70.

As illustrated in FIG. 4, the guide 262 has an inclined surface along the direction in which the toner bottle 32B is inserted into the toner container mount 70. The inclined surface is formed to protrude toward the +Z direction as it goes toward the +X direction. The guide 262 having the inclined surface is disposed in this way, when the toner bottle 32B is inserted into the toner container mount 70, such that the electrodes 32B6 can be aligned in the Z direction at positions at which the electrodes 32B6 can be contactable with the terminals 261.

As illustrated in FIG. 4, the toner remaining amount detector 200 includes the tuning forks 210, a vibration detector 220, and a controller 230. The tuning fork 210 is, in a general sense, an acoustic device that generates a sound of a certain frequency when tapped, and is formed by bending a homogeneous steel into a U-shape and attaching a handle to the center of the tuning fork 210. The tuning fork 210 includes a pair of vibrating pieces disposed to face each other and a curved portion connecting the vibrating pieces. The pair of vibrating pieces and the curved portion form the above-described U-shape.

In particular, in the present embodiment, the tuning fork 210 of the toner remaining amount detector 200 is made of metal, is formed united with the terminals 261, and receives the load of the toner bottle 32B via the terminals 261. Specifically, as illustrated in FIG. 4, in the tuning fork 210, a base 214 is erected on the +Z direction from the communication circuit 260 and is electrically connected to the communication circuit 260. In the tuning fork 210, a pair of vibrating pieces of the U-shaped portion connected to the base 214 extend along the X direction and are disposed to face each other in the Z direction. The terminal 261 is connected to one vibrating piece disposed on the +Z direction. The tip of the other vibrating piece disposed on the −Z direction is connected to the upper end of the base 214. As illustrated in FIG. 3, four tuning forks 210 are also disposed and arranged along the Y direction. Each tuning fork 210 is connected to any one of the four terminals 261. Thus, the four sets of terminals 261 and the tuning fork 210 are united with each other. The terminals 261 contact the electrodes 32B6, such that the ID substrate 32B5 on the toner bottle 32B and the communication circuit 260 on the image forming apparatus are electrically connected to each other via the terminals 261 and the tuning fork 210.

The vibration detector 220 detects the vibration of the tuning fork 210 due to a load received from the toner bottle 32B. The vibration detector 220 is electrically connected to an input-side piezoelectric transducer disposed on one of the vibrating pieces of the tuning fork 210 and an output-side piezoelectric transducer disposed on the other vibrating piece 212. The vibration detector 220 is, for example, an oscillation circuit using the tuning fork 210 as a feedback circuit, and can detect information related to the transition of the vibration of the tuning fork 210 based on the transition of the oscillation of the oscillation circuit when a load due to the weight of the toner of the toner bottle 32B is applied.

The controller 230 estimates the toner remaining amount in the toner bottle 32B based on information on the vibration of the tuning fork 210 detected by the vibration detector 220.

The toner remaining amount detector 200 includes a vibration generator 270. The vibration generator 270 is a device that forcibly vibrates the tuning fork 210. In the present embodiment, the vibration generator 270 physically strikes the tuning fork 210 to vibrate the tuning fork 210. The vibration generator 270 includes a gear 271, a rod 272, and a support 273.

The gear 271 is driven to rotate by a driver such as a motor. In the example of FIG. 4, the gear 271 is disposed to have a rotation shaft C1 along a Y-axis direction. The gear 271 is disposed on the +X direction with respect to the tuning fork 210.

The rod 272 is coupled such that one end 272A of the rod 272 having a longitudinal shape is rotatable in parallel with the rotation shaft C1 of the gear 271. The one end 272A of the rod 272 is coupled to the rotation shaft C1 of the gear 271 such that the rotation shaft C2 is disposed on the centrifugal side of the circular shape of the gear 271. The rod 272 is disposed such that the other end 272B faces the tuning fork 210 in the −X direction.

The support 273 is disposed between the gear 271 and the tuning fork 210, and supports the rod 272 from below (the −Z direction). In other words, the rod 272 is supported at two points, i.e., at a connecting portion 274 with the gear 271 and at the contact portion with the support 273.

Figure 6:
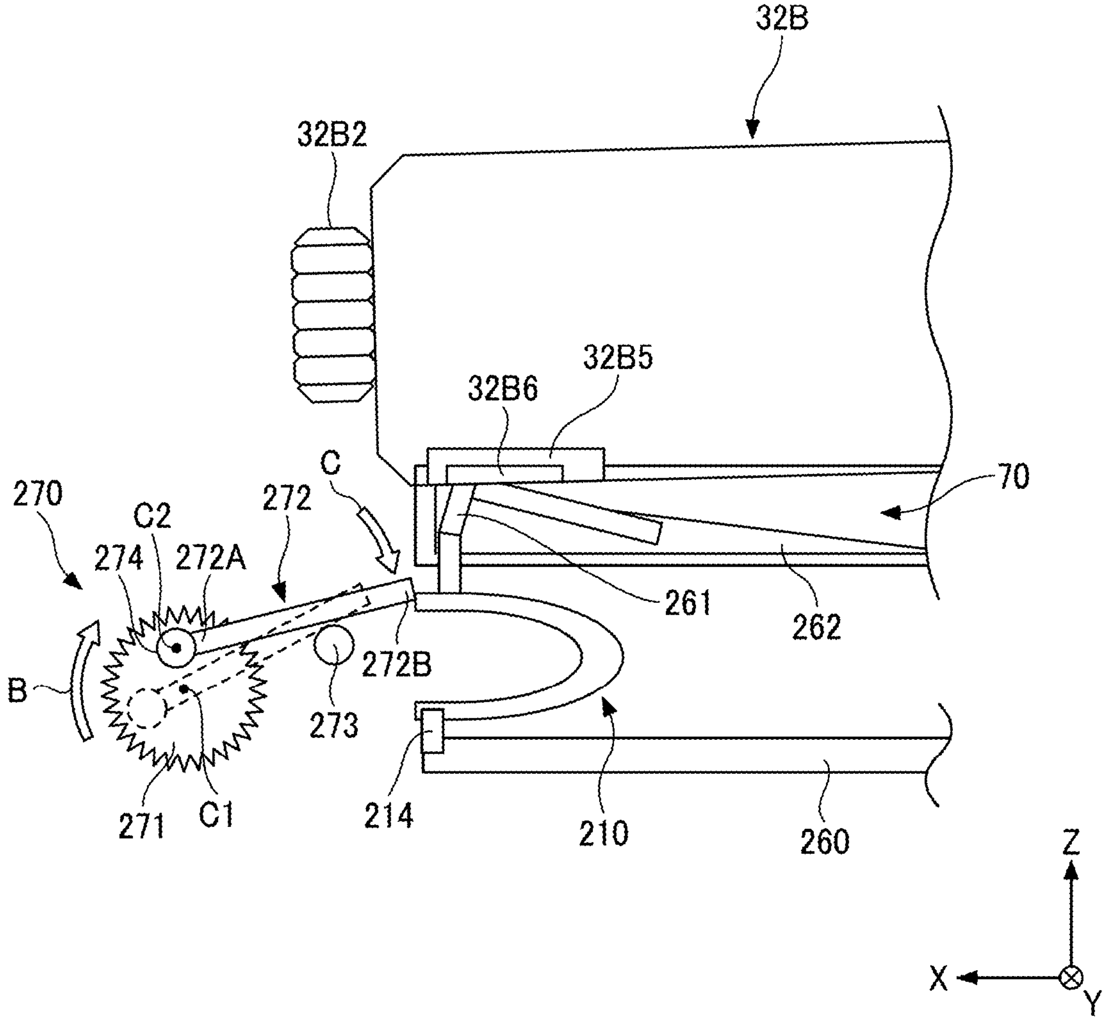
FIG. 6 is a diagram illustrating a first stage of an operation state of a vibration generator.

FIG. 6 is a view illustrating a first stage of the operation state of the vibration generator 270. In FIG. 6, the non-operating state of the vibration generator 270, that is, the state illustrated in FIG. 4 is illustrated by a dashed line. In the non-operating state, the other end 272B of the rod 272 is located at a position away from the tuning fork 210, and the vibration generator 270 does not vibrate the tuning fork 210 because the vibration generator 270 is not in contact with the tuning fork 210. In the non-operating state, the connecting portion 274 with the one end 272A is located below (−Z direction) and on the left (+X direction) of the rotation shaft C1 of the gear 271, and thus, the other end 272B of the rod 272 is disposed to be largely inclined obliquely upward to the right in FIG. 6 by the support 273 and is located above (+Z direction) and on the left (+X direction) of the tuning fork 210.

On the other hand, as illustrated in FIG. 6, when the vibration generator 270 is operated, the gear 271 is first rotated. In the example of FIG. 6, the gear 271 is rotating in the clockwise direction as indicated by the arrow B. The connecting portion 274 of the gear 271 and the rod 272 is also moved in the clockwise direction around the rotation shaft C1 by the rotation of the gear 271. With such a configuration, the one end 272A of the rod 272 also moves in the same manner, and rotates around the rotation shaft C2 of the connecting portion 274 to move upward (+Z direction) and to the right in FIG. 6 (−X direction) compared to the non-operating state. As a result, the protrusion amount of the rod 272 from the support 273 in the −X direction increases, and the other end 272B of the rod 272 approaches the tuning fork 210. Further, the connecting portion 274 moves to the +Z direction by the rotation of the gear 271. Thus, the rod 272 rotates as a support point by the support 273, and the other end 272B of the rod 272 moves to the −Z direction opposite to the connecting portion 274. In other words, the other end 272B of the rod 272 moves from a position on the +X direction and the +Z direction to a position on the −X direction and the −Z direction where the other end 272B contacts the tuning fork 210 by the rotation of the gear 271, as indicated by the arrow C in FIG. 6. As a result, the vibration generator 270 can strike the tuning fork 210 with the rod 272 to forcibly vibrate the tuning fork 210.

Figure 7:
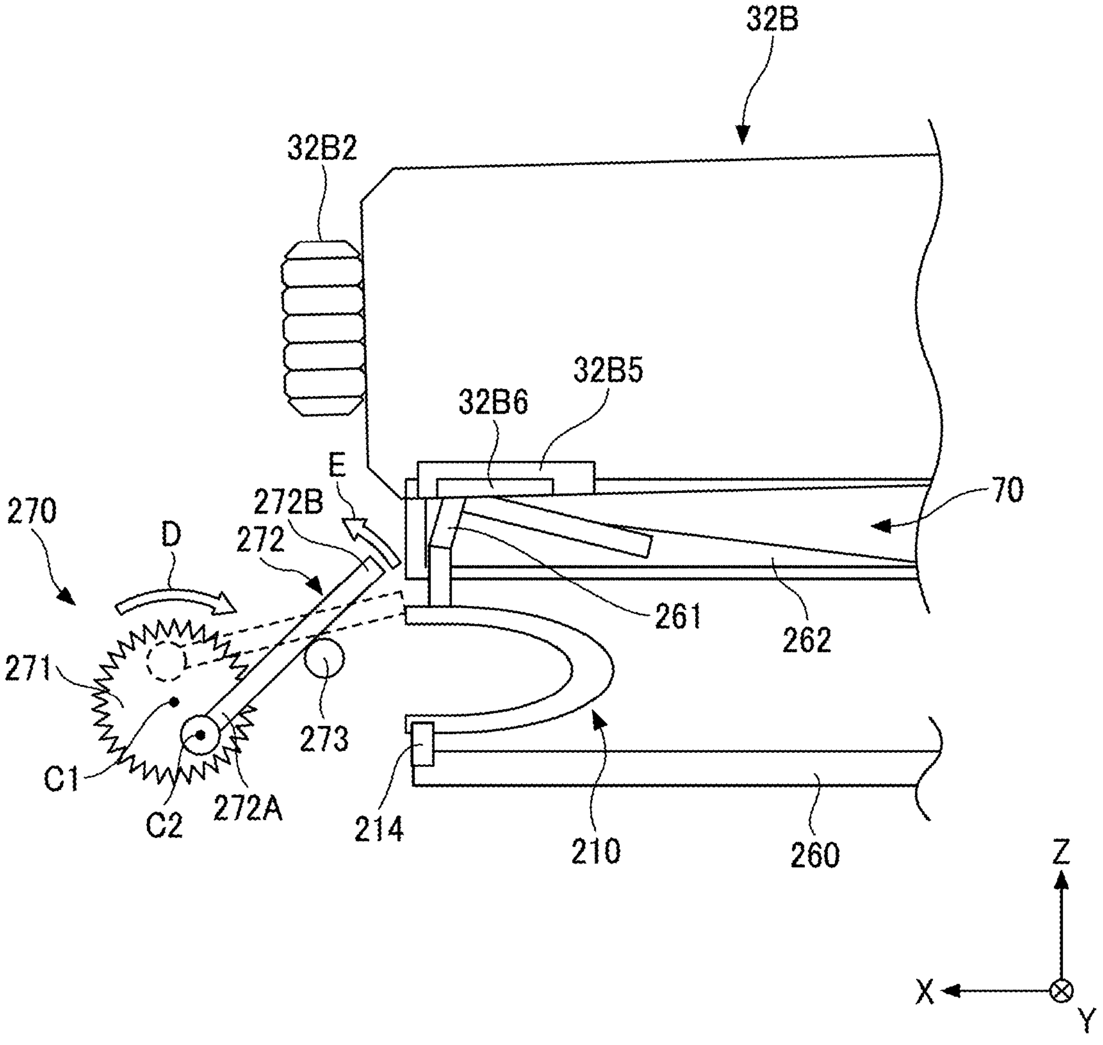
FIG. 7 is a diagram illustrating a second stage of an operation state of a vibration generator.

FIG. 7 is a view illustrating a second stage of the operation state of the vibration generator 270. In FIG. 7, the striking posture of the vibration generator 270, that is, the first stage of the operation state illustrated in FIG. 6 is illustrated by a dashed line.

As illustrated in FIG. 7, after the rod 272 strikes the tuning fork 210, the rod 272 is preferably separated from the tuning fork 210 as soon as possible in order not to restrict the vibration of the tuning fork 210. In the vibration generator 270, as illustrated by an arrow D in FIG. 7, the gear 271 is continuously rotated in the clockwise direction from the contact state between the rod 272 and the tuning fork 210 illustrated in FIG. 6. Thus, the rod 272 rotates around the rotation shaft C2 of the connecting portion 274 while one end 272A of the rod 272 and the connecting portion 274 rotate downward (−Z direction), such that the other end 272B of the rod 272 jumps upward (+Z direction) with the support 273 as a fulcrum as illustrated by an arrow E in FIG. 7. Such a configuration can immediately separate the other end 272B of the rod 272 from the tuning fork 210.

The operation of the vibration generator 270 can also be controlled by, for example, the controller 230 of the toner remaining amount detector 200. The controller 230 rotates the gear 271 at any timing to operate the vibration generator 270. The timing of operating the vibration generator 270 is preferably set, for example, immediately before communication is performed between the communication circuit 260 and the toner bottle 32B. Alternatively, the timing may be set when communication between the communication circuit 260 and the toner bottle 32B fails.

The effect of the vibration generator 270 is described below. In the present embodiment, the toner bottle 32B is applied to the toner container of the image forming apparatus 100. The toner bottle 32B is preferably insertable into and removable from the toner container mount 70. Due to the structure of the toner bottle 32B, when the toner in the toner bottle 32B is supplied to the developing device 5 of the image forming apparatus 100 or when the toner bottle 32B is inserted into and removed from the toner container mount 70, the toner may spill out from the discharge port 32B2 of the toner bottle 32B. For this reason, the electrodes 32B6 and the terminals 261, which are contact portions for communication between the toner bottle 32B and the communication circuit 260, may be contaminated by the toner, and communication may be hindered. A user or an administrator of the image forming apparatus 100 cleans the dirt, so that such a situation can be solved. However, the countermeasure by the personnel may cause disadvantages such as a service cost for the cleaning work, and a communication failure may occur due to an inappropriate timing of the cleaning.

When the tuning fork 210 included in the toner remaining amount detector 200 according to the embodiment receives energy, the tuning fork 210 vibrates at a high frequency due to resonance. As described above, the tuning fork 210 is directly connected to the terminal 261, so that the terminal 261 vibrates when the tuning fork 210 vibrates. When the terminals 261 contact the electrodes 32B6 of the toner bottle 32B, the vibration of the tuning fork 210 can be transmitted to the electrodes 32B6. The energy for adhering the toner powder to the terminals 261 and the electrodes 32B6 is mainly electrostatic force or intermolecular gravity. However, using the high-frequency vibration generated by the tuning fork 210 to shake off the toner powder is effective.

In the present embodiment, the vibration generator 270 is operated to forcibly vibrate the tuning fork 210, so that the toner particles adhering to the terminals 261 of the communication circuit 260 and the electrodes 32B6 of the toner bottle 32B can be sufficiently removed by the high-frequency vibration generated by the tuning fork 210. Such a configuration can appropriately prevent the communication between the communication circuit 260 and the toner bottle 32B via the terminals 261 and the electrodes 32B6 from being hindered.

The timing at which the vibration generator 270 is operated to shake off the toner adhering to the terminals 261 and the electrodes 32B6 is preferably set, for example, before (preferably immediately before) the communication between the communication circuit 260 and the toner bottle 32B as described above, or when the communication between the communication circuit 260 and the toner bottle 32B fails. Such a configuration can enhance the situation in which the communication between the communication circuit 260 and the toner bottle 32B is hindered at a more appropriate timing.

The vibration generator 270 of the present embodiment physically hits the tuning fork 210 by using the rod 272 to forcibly vibrate the tuning fork 210. Such a configuration can more reliably apply an external force to the tuning fork 210 with a simple configuration. The tuning fork can be forcibly vibrated more reliably, and thus toner can be removed easily and reliably.

In the present embodiment, the gear 271 of the vibration generator 270 is a plate having a disc shape, and has a gear on the outer circumference thereof. With such a configuration, a driving force is transmitted from a drive source to the gear 271 via, for example, a gear to rotate around the rotation shaft. The gear 271 may be any element that is connected to at least one end of the rod 272 and can change the posture of the rod 272 as described above, and is not limited to a gear shape. For example, the gear 271 may be a plate-like rotator without a gear. The driving force may be transmitted to the gear 271 via a rotation shaft to rotate. The vibration generator 270 may physically strike the tuning fork 210 to forcibly vibrate the tuning fork 210, and is not limited to the configurations illustrated in FIGS. 4 and 6.

Figure 8:
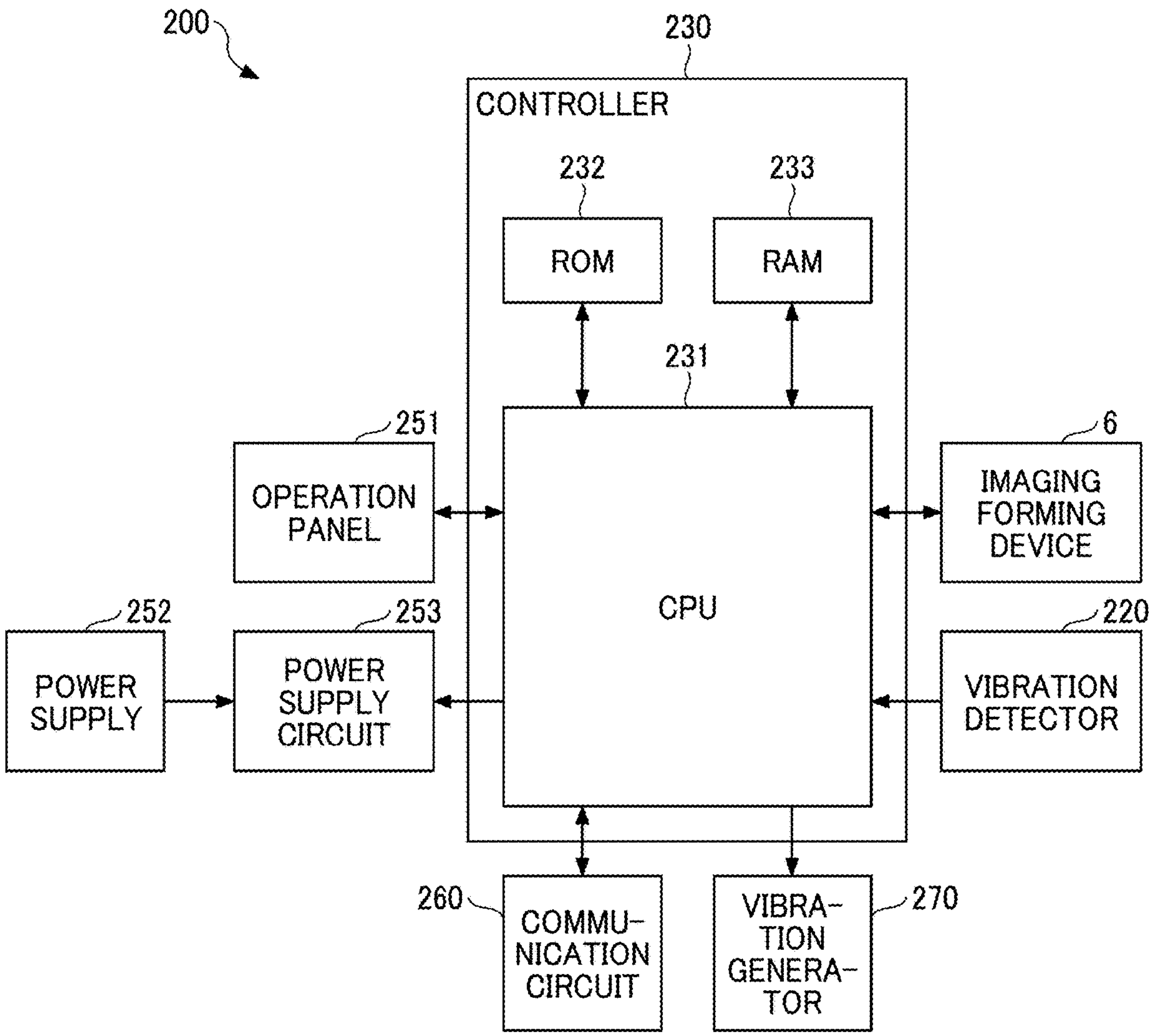
FIG. 8 is a hardware diagram of a controller in FIG. 4.

FIG. 8 is a hardware diagram of the controller 230 in FIG. 4.

The controller 230 includes a central processing unit (CPU) 231, a read-only memory (ROM) 232, and a random-access memory (RAM) 233. These components are electrically connected to each other via a system bus.

The CPU 231 is a processor that controls the entire toner remaining amount detector 200 and comprehensively controls access to various devices connected to the system bus based on a control program stored in the ROM 232. The CPU 231 can execute a control program stored in the ROM 232 with the RAM 233 as a work area to implement various functions described later.

The ROM 232 is a read-only nonvolatile memory and stores, for example, control programs and control information used by the CPU 231. The ROM 232 stores information regarding the toner remaining amount detector 200 used by the control programs.

The RAM 233 is a volatile memory that allows high-speed reading and writing of information, and is used as a work frame memory for expanding recorded information and storing environmental information.

The CPU 221 can exchange information with an operation panel 251 disposed in the image forming apparatus 100. The operation panel 251 includes a display that displays information and an input device that receives an operation, and functions as a user interface. The CPU 221 displays information on the toner remaining amount estimated based on the vibration frequency detected by the vibration detector 220 on the operation panel 251, and also displays an ordering instruction and a replacement instruction of toner under a specified condition.

A power supply 252 is an alternating current (AC) commercial power supply. A power supply circuit 253 converts an AC voltage supplied from the power supply 252 into a direct current (DC) voltage and supplies power to each unit of the image forming apparatus 100. The CPU 221 can control power supply from the power supply circuit 253 to each unit of the image forming apparatus 100.

The CPU 221 can exchange signals and date with the vibration detector 220 to control the operation of the image forming device 6.

The CPU 221 can exchange signals and date with the communication circuit 260 to control the toner bottle 32B by the communication circuit 260. The CPU 221 can output a control command to the vibration generator 270 to control the operation of the vibration generator 270.

Various functions to be described later, which are implemented by the CPU 221, may be implemented by an electronic circuit or an electric circuit such as an application-specific integrated circuit (ASIC) or a field-programmable gate array (FPGA).

In the present embodiment, the communication circuit 260 and the vibration generator 270 are controlled by the controller 230 of the toner remaining amount detector 200. However, when the image forming apparatus 100 includes another control device that controls the operation of each element in the image forming apparatus 100, the communication circuit 260 and the vibration generator 270 may be controlled by the other control device.

Figure 9:
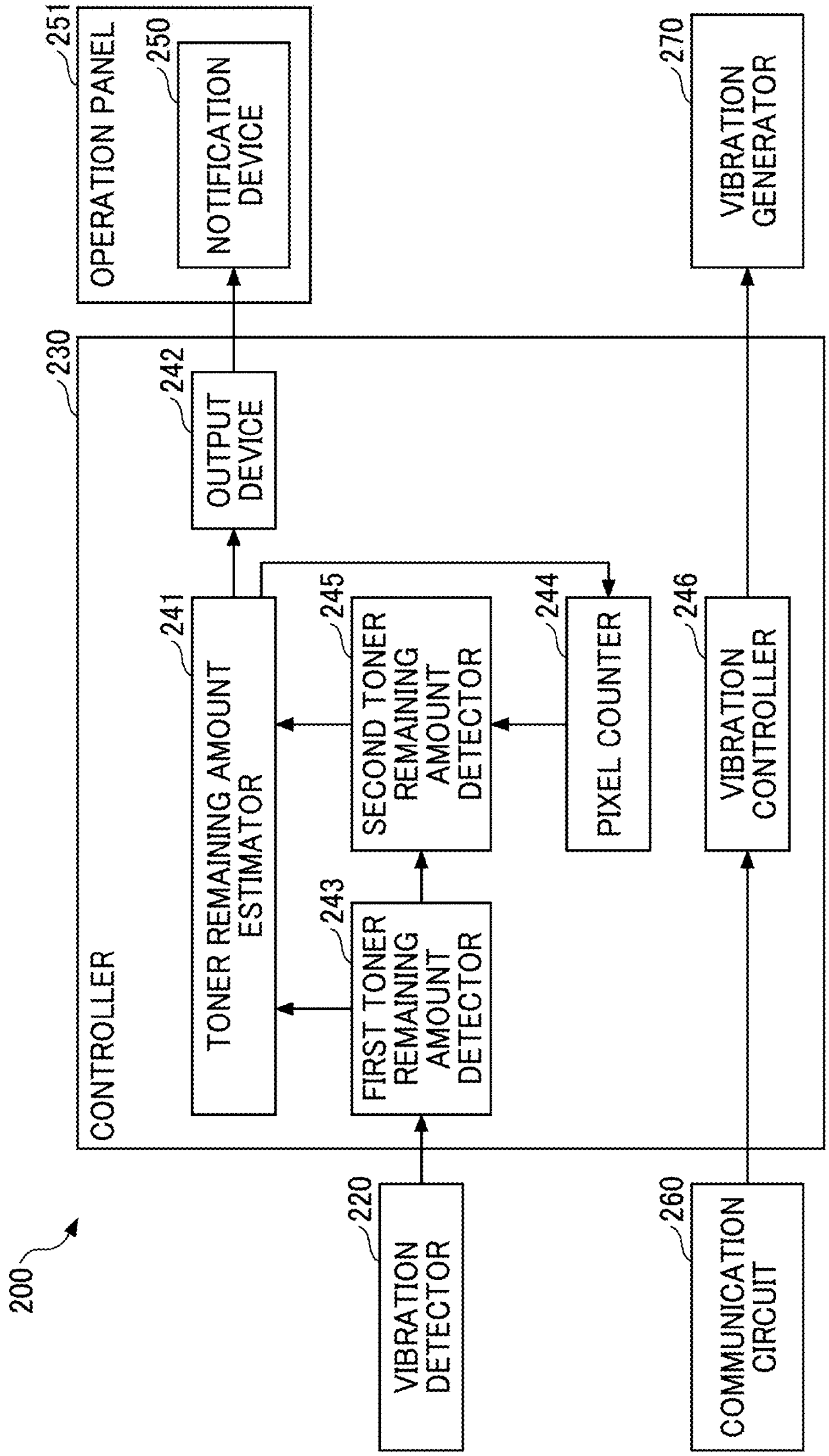
FIG. 9 is a functional block diagram illustrating a controller according to the present embodiment.

FIG. 9 is a functional block diagram of the controller 230 according to the present embodiment.

As illustrated in FIG. 9, the controller 230 includes a toner remaining amount estimator 241, an output device 242, a first toner remaining amount detector 243, a pixel counter 244, a second toner remaining amount detector 245, and a vibration controller 246.

The functions of the toner remaining amount estimator 241, the output device 242, the first toner remaining amount detector 243, the pixel counter 244, the second toner remaining amount detector 245, and the vibration controller 246 are implemented, for example, by the CPU 231 executing a specified program.

The toner remaining amount estimator 241 estimates the toner remaining amount in the toner bottle 32B, and outputs the estimation result to a notifier 250 of the operation panel 251 via the output device 242.

The first toner remaining amount detector 243 detects the toner remaining amount based on the resonance frequency detection value input from the vibration detector 220 at a specified sampling period. The information of the first toner remaining amount that indicates the detected value of the toner remaining amount is output to the toner remaining amount estimator 241 and the second toner remaining amount detector 245.

The pixel counter 244 counts the number of pixels composing an image formed on the recording medium P when the image forming apparatus 100 executes image formation. The counting of the number of pixels is performed each time an image is formed on the recording medium P, and the cumulative pixel count number is acquired. The cumulative pixel count number corresponds to the "cumulative value of the number of pixels" and is an example of "cumulative information".

The pixel counter 244 can reset the number of the cumulative pixel count at a specified opportunity. The "specified opportunity" includes, for example, a switching time at which the ambient temperature of the toner cartridge is switched from a state of being within a specified temperature to a state of not being within a specified range. The reset processing of the number of the estimation pixel count is performed by, for example, a control command from the toner remaining amount estimator 241. When the number of the cumulative pixel count is reset, the pixel counter 244 starts counting from zero, that is, the initial state. The pixel counter 244 outputs the number of the cumulative pixel count to the second toner remaining amount detector 245 every time image formation is performed.

The second toner remaining amount detector 245 predicts the toner consumption amount based on the number of the cumulative pixel count input from the pixel counter 244. Subtracting the toner consumption amount from a reference value of the toner remaining amount in the toner bottle 32B (toner container 32) to detect the toner remaining amount.

When the toner bottle 32B is in a full state, the toner remaining amount in the full state at the time of initial filling is set as the reference value of the toner remaining amount. When the first toner remaining amount detector 243 detects the remaining toner amount, the remaining toner amount indicated by the information of the first remaining toner amount is set as the reference value of the remaining toner amount.

After detecting the toner remaining amount by the cumulative information method, the second toner remaining amount detector 245 outputs the information of the second toner remaining amount indicating the detected value of the toner remaining amount to the toner remaining amount estimator 241.

The vibration controller 246 controls the operation of the vibration generator 270. The vibration controller 246 outputs a control command to the vibration generator 270 to operate the vibration generator 270 and forcibly vibrate the tuning fork 210 before the communication circuit 260 communicates with the toner bottle 32B, for example, when the main power supply of the image forming apparatus 100 is switched to the ON state. With such a configuration, when the communication circuit 260 communicates with the toner bottle 32B, the vibration generator 270 is always operated in advance to forcibly vibrate the tuning fork 210. Thus, the vibration can remove the powder of toner adhering to the terminals 261 of the communication circuit 260 and the electrodes 32B6 of the toner bottle 32B. Such a configuration can appropriately prevent the communication between the communication circuit 260 and the toner bottle 32B via the terminals 261 and the electrodes 32B6 from being hindered.

Alternatively, the vibration controller 246 may output a control command to the vibration generator 270 when the vibration controller 246 receives the control command from the communication circuit 260. For example, when the communication circuit 260 communicates with the toner bottle 32B, the communication circuit 260 outputs a control command in advance to start communication or to operate the vibration generator 270 to the vibration controller 246. After the vibration generator 270 operates in response to the control command, the communication circuit 260 starts communication with the toner bottle 32B. With such a configuration, the powder of toner adhering to the terminals 261 of the communication circuit 260 and the electrodes 32B6 of the toner bottle 32B can be removed immediately before the communication circuit 260 communicates with the toner bottle 32B. For this reason, a situation in which toner is adhering to the terminals 261 and the electrodes 32B6 during communication can be more reliably avoided, and an inconvenience that the communication between the communication circuit 260 and the toner bottle 32B is hindered can be reliably prevented.

For example, when some error occurs in communication between the communication circuit 260 and the toner bottle, such as when the communication circuit 260 does not acquire desired information from the toner bottle 32B, the communication circuit 260 may output a control command to the vibration controller 246 to indicate that a communication error has occurred or to operate the vibration generator 270. After the vibration generator 270 operates in response to the control command, the communication circuit 260 communicates with the toner bottle 32B again. With such a configuration, the vibration generator 270 can be controlled to recover from the communication error, and thus, the downtime of a user when the communication error occurs can be reduced.

In the present embodiment, a configuration is exemplified in which the vibration controller 246 that controls the vibration generator 270 is disposed in the controller 230 of the toner remaining amount detector 200. However, in the case where the image forming apparatus 100 includes another control device that controls the operation of each element in the image forming apparatus 100, a function corresponding to the vibration controller 246 may be provided in the other control device.

Figure 10:
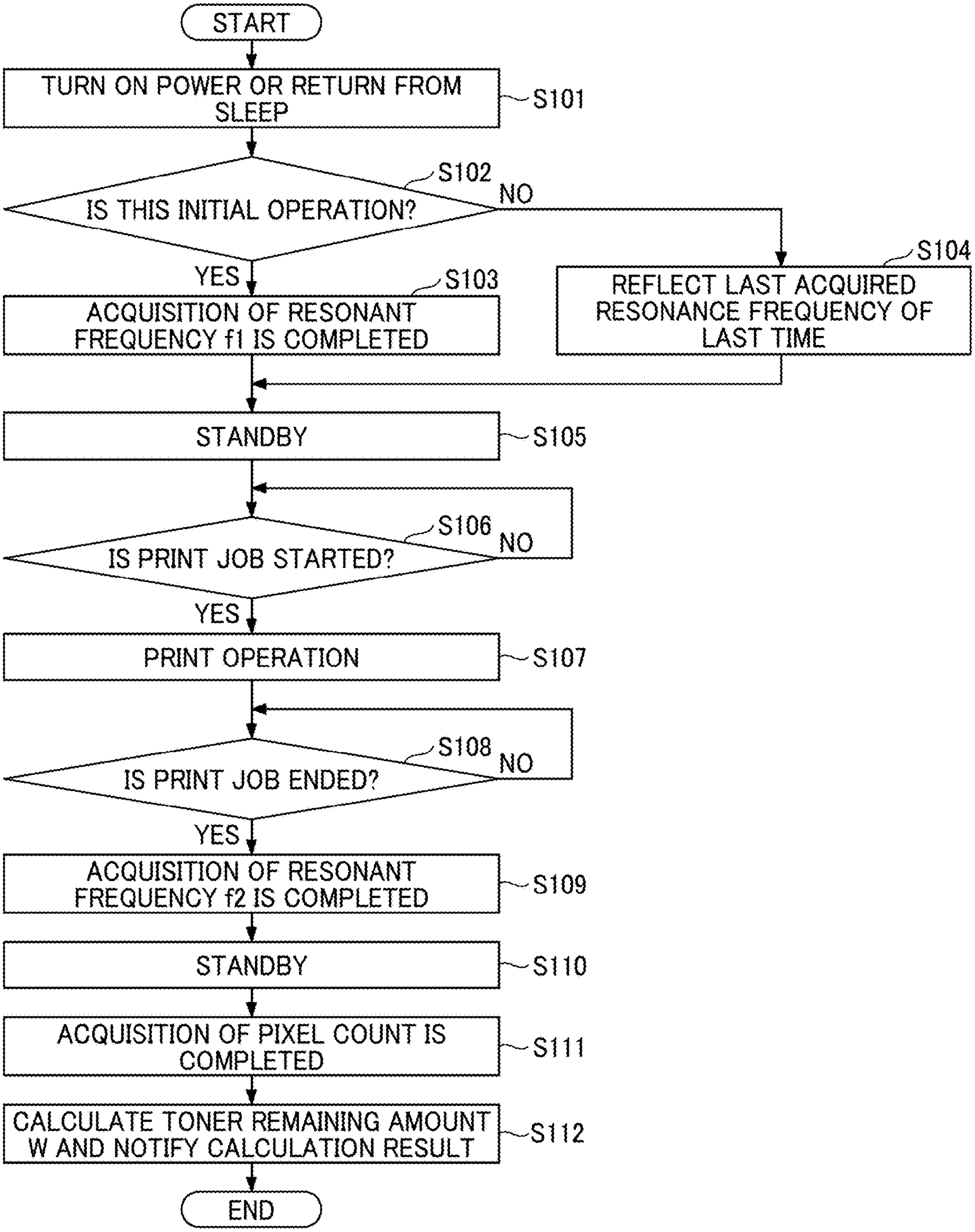
FIG. 10 is a flowchart of the toner remaining amount detection control according to the present embodiment.

Next, with reference to FIG. 10, a description is given of an example of the toner remaining amount detection control performed by the toner remaining amount detector 200 according to the present embodiment.

FIG. 10 is a flowchart of the toner remaining amount detection control according to the present embodiment.

In step S101, the image forming apparatus 100 is powered on or returns from the sleep state.

In step S102, it is checked whether the image forming apparatus 100 has been initialized. The initial operation is performed, for example, when the image forming apparatus 100 is powered on, and includes a preparation operation for setting each element of the image forming apparatus 100 in a stopped state to a state in which a print job can be performed.

When the initial operation is performed (Yes in S102), the process proceeds to step S103, and the first toner remaining amount detector 243 acquires information on the resonance frequency of the tuning fork 210 from the vibration detector 220 (a detecting step and an acquiring step). This frequency are stored as "first vibration frequency f1 at which the tuning fork 210 resonates with the toner bottle 32B before the start of the print job". In FIG. 10, the "first vibration frequency f1" are denoted as "resonance frequency f1".

On the other hand, when the initial operation is not performed (No in S102), the procedure proceeds to step S104, and the resonance frequency finally acquired as the first vibration frequency f1 in the previous processing procedure (previous finally acquired resonance frequency) are reflected as the first vibration frequency f1 (the detecting step and the acquiring step). In other words, the "first vibration frequency f1" is overwritten with new information only when the initial operation is performed in the image forming apparatus 100.

After step S103 or S104, the image forming apparatus 100 enters a standby state before a print job is performed in step S105. Thereafter, the image forming apparatus 100 is in a state in which a print job can be started at any timing.

In step S106, the procedure waits until the image forming apparatus 100 starts a print job, and the procedure proceeds to step S107 after the print job is started.

In step S107, the image forming apparatus 100 performs a printing operation.

In step S108, the procedure waits until the print job is completed by the image forming apparatus 100, and the procedure proceeds to step S109 after the print job is completed.

In step S109, the first toner remaining amount detector 243 acquires information on the resonance frequency of the tuning fork 210 from the vibration detector 220 (the detecting step and the acquiring step). The frequency are stored as "second vibration frequency f2 at which the tuning fork resonates with the toner bottle 32B after the print job is completed". In other words, the "second vibration frequency f2" are overwritten with new information every time a print job is performed in the image forming apparatus 100. In FIG. 10, the "second vibration frequency f2" are referred to as "resonance frequency f2".

In step S110, the image forming apparatus 100 is in a standby state after the print job is completed.

In step S111, the pixel counter 244 counts the number of pixels composing the image formed on the recording medium P in the current print job. The pixel counter 244 outputs information (pixel count value) of the number of pixels counted in the current print job to the second toner remaining amount detector 245.

In step S112, the toner remaining amount estimator 241 calculates and notifies the toner remaining amount W (an estimation step). For example, the estimation process of this step is performed by the following first to third procedures.

First Procedure

The first toner remaining amount detector 243 calculates a first estimated value W1 of the toner use amount of the current print job using the difference between the first vibration frequency f1 before the start of the print job acquired in step S103 or S104 and the second vibration frequency f2 after the end of the print job acquired in step S109. It is known that the tuning fork 210 has a characteristic that the oscillation frequency changes when a weight is applied to the tuning fork 210. In view of this characteristic, the first toner remaining amount detector 243 estimates a toner weight value based on the change amounts of the resonance frequencies f1 and f2 before and after the print job by using a load detector based on a tuning fork structure, that is, the tuning fork 210 and the vibration detector 220 included in the toner remaining amount detector 200 according to the present embodiment. The first toner remaining amount detector 243 holds, for example, a frequency-weight value conversion table in which the relation between the difference between the resonance frequencies f1 and f2 before and after the print job and the weights is tabled in advance, for example, in a memory. The first toner remaining amount detector 243 calculates the difference between the resonance frequency f1 before the start of the print job acquired in step S103 or S104 and the resonance frequency f2 after the end of the print job acquired in step S109. With reference to the frequency-weight value conversion table, the toner weight value corresponding to the difference between the resonance frequencies f1 and f2 is obtained. The first toner remaining amount detector 243 outputs the toner weight value acquired in this way to the toner remaining amount estimator 241 as the first estimated value W1.

Second Procedure

The second toner remaining amount detector 245 calculates a second estimated value W2 of the toner use amount of the current print job using the information of the pixel count value acquired in step S111. The second toner remaining amount detector 245 holds a table of the toner weight value of adhering to one pixel (one pixel weight value) due to environmental changes, for example, in a memory in advance. The second toner remaining amount detector 245 acquires the one pixel weight value from the table based on the environmental conditions at the time of execution of the current print job. A value obtained by multiplying the one pixel weight value by the pixel count value is the used toner weight value obtained from the pixel count acquisition value. The second toner remaining amount detector 245 outputs the toner weight value thus obtained to the toner remaining amount estimator 241 as the second estimated value W2.

Third Procedure

The toner remaining amount estimator 241 estimates the toner remaining amount W by using the first estimated value W1 and the second estimated value W2. The toner remaining amount estimator 241, for example, averages the first estimated value W1 and the second estimated value W2 to calculate the toner weight value used in the current print job. The initial value of the toner weight value stored in the toner bottle 32B is uniformly determined depending on, for example, the type of the toner bottle 32B used in the image forming apparatus 100. After the start of use of the toner bottle 32B to be estimated, the toner remaining amount estimator 241 repeats the process of subtracting the toner weight value calculated for each print job from the initial value, and holds the calculated result as the latest toner weight value, that is, the toner remaining amount. In other words, the toner remaining amount estimator 241 subtracts the toner weight value calculated in the current processing procedure from the toner remaining amount calculated in the previous processing procedure to calculate the latest toner remaining amount W.

In step S112, the toner remaining amount estimator 241 outputs information on the toner remaining amount W estimated by the above-described first to third procedures to the notifier 250 of the operation panel 251 via the output device 242, and can notify a user of the image forming apparatus 100 of the toner remaining amount.

In step S112, the toner remaining amount W may be estimated using only the difference between the first vibration frequency f1 before the start of the print job and the second vibration frequency f2 after the end of the print job. In this case, in the third procedure described above, the processing of subtracting only the first estimated value W1 calculated in the first procedure from the initial value of the toner weight value is repeated for each print job to calculate the toner remaining amount W.

As described above, in the present embodiment, the toner remaining amount W can be estimated using information that is less likely to be affected by the bias of toner in the toner bottle 32B, such as the resonance frequencies f1 and f2 at which the tuning fork 210 resonates with the toner bottle 32B. With such a configuration, in the image forming apparatus 100, the toner remaining amount W can be accurately detected regardless of the remaining amount in the toner container 32 and the deviation of toner.

In the present embodiment, the tuning fork 210 of the toner remaining amount detector 200 is united with the terminals 261 as electrical connection elements between the ID substrate 32B5 on the toner bottle 32B and the communication circuit 260 on the image forming apparatus. With such a configuration, the positioning mechanism for applying the load of the toner bottle 32B to the tuning fork 210 and the positioning mechanism for inserting and removing the toner bottle 32B into and from the toner container mount 70 can be implemented by a single mechanism, and thus both positioning can be achieved with a simple configuration.

The toner remaining amount detection control is not limited to the procedures and contents of the flowchart of FIG. 10, and other methods may be used.

Figure 11:
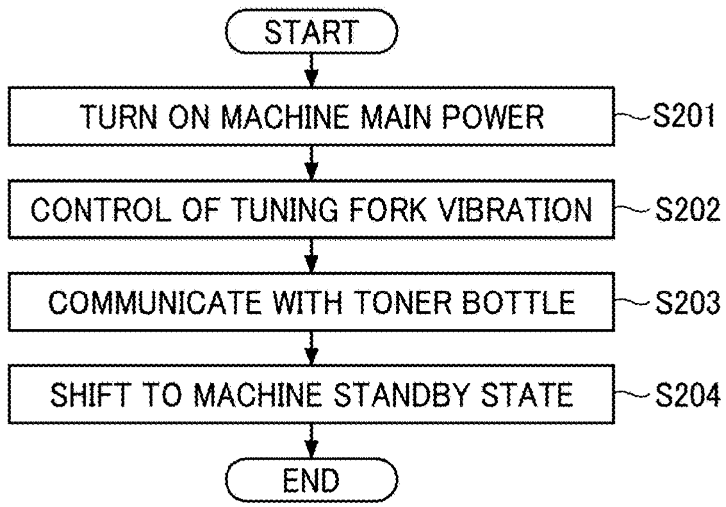
FIG. 11 is a flowchart of control of a vibration generator according to the present embodiment.
Figure 12:
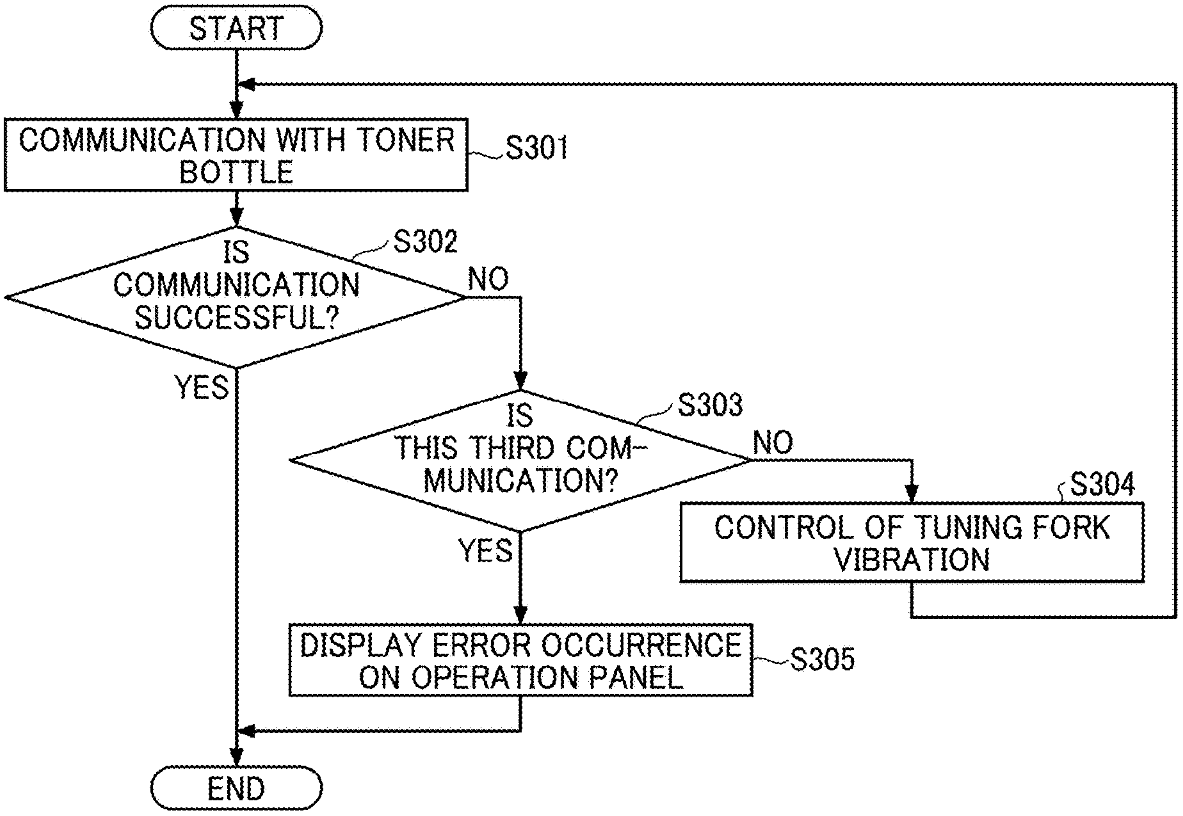
FIG. 12 is a flowchart of another control of a vibration generator according to the present embodiment.

Next, with reference to FIGS. 11 and 12, a description is given of communication control between the communication circuit 260 and the toner bottle 32B performed by the image forming apparatus 100 according to the present embodiment. In this communication control, the vibration generator 270 is operated to forcibly vibrate the tuning fork 210 of the toner remaining amount detector 200. The vibration removes toner particles adhering to the terminals 261 of the communication circuit 260 and the electrodes 32B6 of the toner bottle 32B.

FIG. 11 is a flowchart of control of the vibration generator 270 according to the present embodiment.

In step S201, the main power supply of the image forming apparatus 100 is switched to the ON state (the main power supply is ON). The controller 230 of the toner remaining amount detector 200 detects this switching operation.

In step S202, the vibration controller 246 in the controller 230 of the toner remaining amount detector 200 performs tuning fork vibration control in which the vibration generator 270 is operated to forcibly vibrate the tuning fork 210 of the toner remaining amount detector 200 in response to the detection of the main power ON in step S201. Tuning fork vibration control is performed, so that the toner particles adhering to the terminals 261 of the communication circuit 260 and the electrode 32B6 of the toner bottle 32B, which are interposed on the communication passage between the communication circuit 260 and the ID substrate 32B5 of the toner bottle 32B, are removed by the vibration of the tuning fork 210.

In step S203, the communication circuit 260 performs communication with toner bottle 32B.

In step S204, the image forming apparatus 100 shifts to a machine standby state such as a sleep state. When the processing in step S304 of FIG. 12 is completed, the present control procedure ends.

FIG. 12 is a flowchart of the control of the vibration generator 270 according to the present embodiment.

In step S301, the communication circuit 260 performs communication with toner bottle 32B.

In step S302, the communication circuit 260 determines whether the communication with the toner bottle 32B in step S301 has succeeded. When the communication has succeeded (Yes in step S302), the control procedure is completed without performing the tuning fork vibration control. On the other hand, when the communication has failed (No in step S302), the procedure proceeds to step S303.

In step S303, the communication circuit 260 determines whether the number of times of failure of communication in step S302 has reached a specified number of times (three times in the example of FIG. 12). If the number of times of failure of the communication has not reached the specified number of times (No in step S303), the procedure proceeds to step S304. The tuning fork vibration control similar to the tuning fork vibration control in step S202 of FIG. 11 is performed, and then the procedure returns to step S301 to perform the communication again.

On the other hand, if the number of times of failure of the communication in step S302 has reached the specified number of times (Yes in step S303), the procedure proceeds to step S305. Occurrence of a communication error is displayed on the operation panel 251 to notify a user the occurrence of the communication error. In this case, it is considered that the communication error is not solved only by the vibration generator 270, and thus, for example, a user or an administrator performs a recovery operation such as visually checking the error situation. When the processing in step S305 of FIG. 12 is completed, the present control procedure ends.

As described above, in the image forming apparatus 100 of the present embodiment, the vibration generator 270 performs the tuning fork vibration control to forcibly vibrate the tuning fork 210 of the toner remaining amount detector 200, so that toner powder adhering to the terminals 261 of the communication circuit 260 and the electrodes 32B6 of the toner bottle 32B can be removed, and thus, the communication between the communication circuit 260 and the toner bottle 32B via the terminals 261 and the electrodes 32B6 can be appropriately prevented from being hindered.

When the vibration generator 270 performs the tuning fork vibration control, so that the toner powder adhering to the tuning fork 210 itself is also removed by the vibration of the tuning fork 210, and thus, the influence of the toner on the frequency of the tuning fork 210 can be reduced. For this reason, the accuracy of estimation of the toner remaining amount in the toner bottle 32B by the toner remaining amount detector 200 can be enhanced, and thus, the toner remaining amount can be accurately detected in the image forming apparatus 100 using the toner bottle 32B.

Modification

Figure 13:
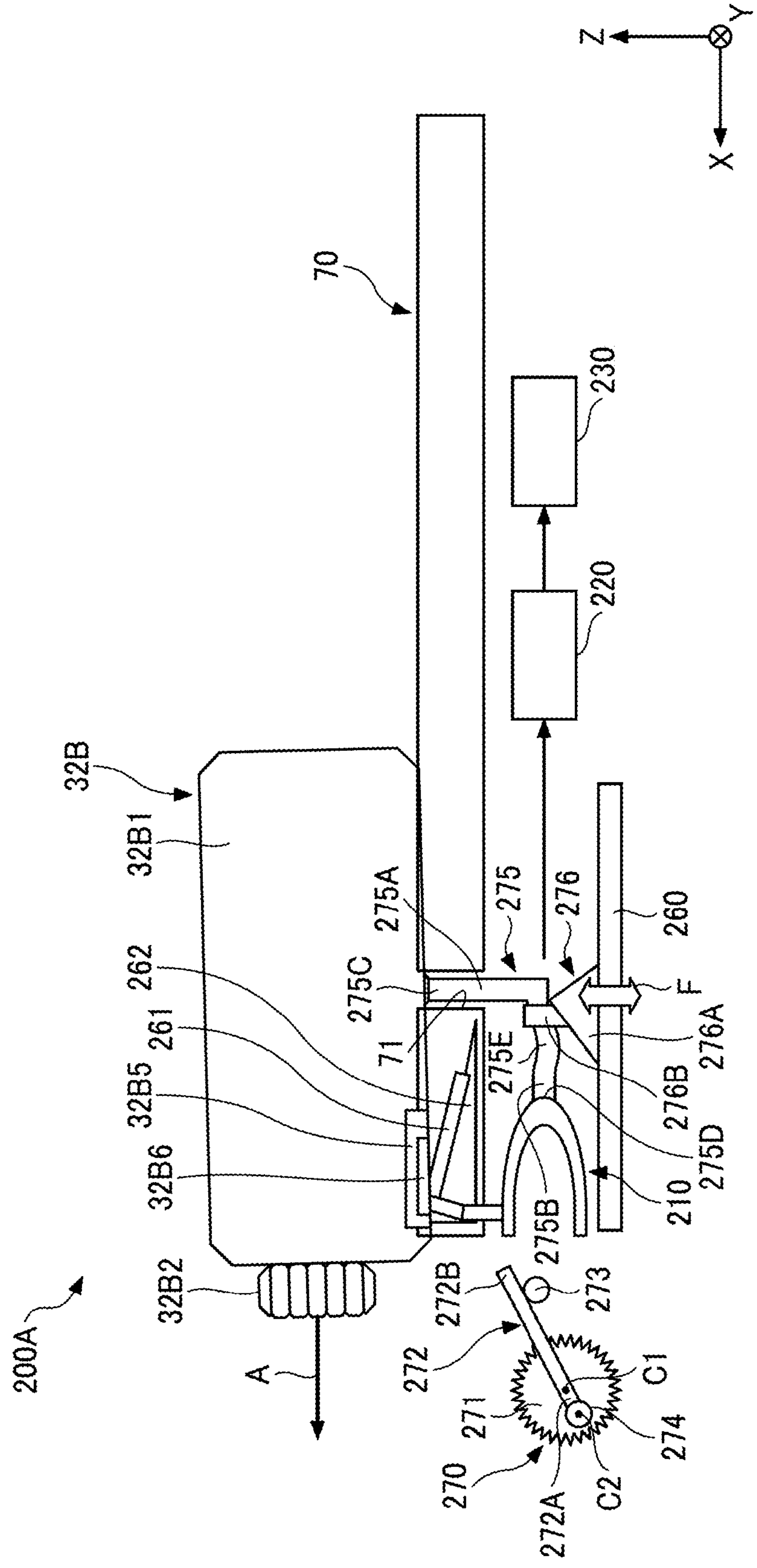
FIG. 13 is a diagram illustrating a vibration generator according to a first modification of the present embodiment.
Figure 14:
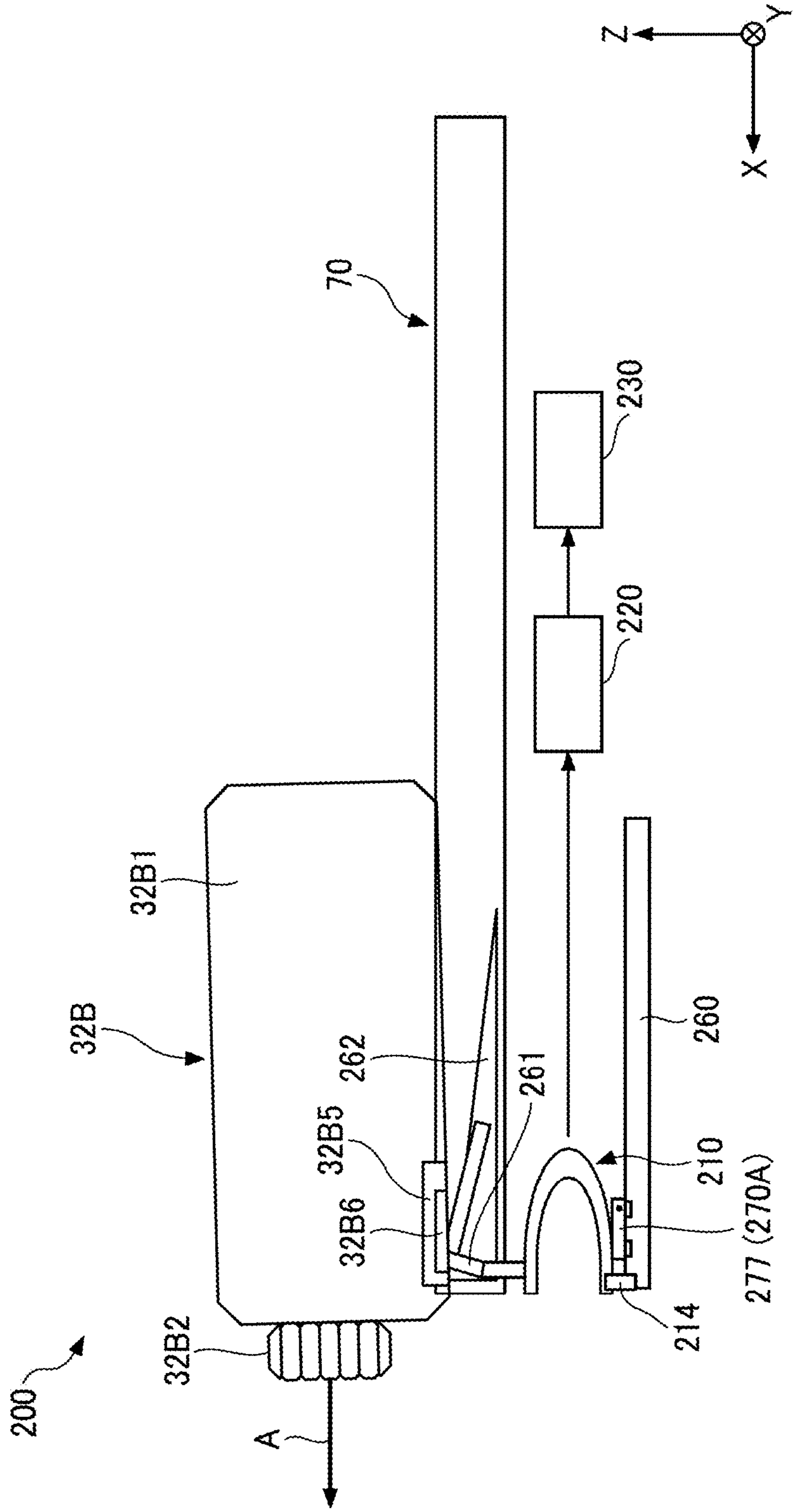
FIG. 14 is a diagram illustrating a vibration generator according to a second modification of the present embodiment.

With reference to FIGS. 13 and 14, a description is given of modifications of the above-described embodiment.

FIG. 13 is a diagram illustrating a first modification of the present embodiment. As illustrated in FIG. 13, a toner remaining amount detector 200A according to the first modification includes a transmitter 275 and a movable portion 276. The transmitter 275 is disposed so that one end thereof can contact the toner bottle 32B, and the other end thereof is coupled to the tuning fork 210. The movable portion 276 is an element that can change the gap between one end of the transmitter 275 and the toner bottle 32B.

In the example of FIG. 13, the transmitter 275 is a member having an elongated shape. The transmitter 275 is bent at an intermediate position in the longitudinal direction and formed in a substantially L shape. The transmitter 275 is disposed below the toner container mount 70. In the example of FIG. 13, the toner container mount 70 has a through hole 71 to penetrate in the vertical direction. The transmitter 275 has a first portion 275A extending in the vertical direction in the substantially L-shape. A part of the first portion 275A passes through the through hole 71 and protrudes upward from the toner container mount 70, so that the one end 275C of the transmitter 275, which is an upper end of the first portion 275A, is contactable with the toner bottle 32B.

The transmitter 275 has a second portion 275B extending in the horizontal direction in the substantially L-shape. The other end 275D of the transmitter 275, which is a tip of the second portion 275B, is coupled to the tuning fork 210. The movable portion 276 is coupled to the second portion 275B of the transmitter 275.

The movable portion 276 is an element in which a base end 276A of the movable portion 276 is fixed to the upper surface of the communication circuit 260 and whose height position of a tip portion 276B coupled to the transmitter 275 can be moved up and down with respect to the upper surface as indicated by the arrow F in FIG. 13. The tip portion 276B of the movable portion 276 has a hook shape, for example, and is locked to the second portion 275B of the transmitter 275 by the portion of the hook shape.

Accordingly, the movable portion 276 moves in an up-and-down direction, and thus, the first portion 275A of the transmitter 275 can also move in the up-and-down direction via the second portion 275B to which the movable portion 276 is coupled. With such a configuration, the one end 275C of the transmitter 275 can be raised to protrude upward from the through hole 71 of the toner container mount 70 and to contact the toner bottle 32B. The one end 275C of the transmitter 275 can be lowered to store in the through hole 71 and to separate from the toner bottle 32B.

In the first modification, when the vibration generator 270 is operated to forcibly vibrate the tuning fork 210, the movable portion 276 raises the first portion 275A of the transmitter 275 so that the one end 275C of the transmitter 275 contacts the toner bottle 32B. With such a configuration, the tuning fork 210 is indirectly contacted with the toner bottle 32B via the transmitter 275, so that the tuning fork 210 can easily resonate. Thus, the vibration of the tuning fork 210 generated by the vibration generator 270 can be amplified at specified wavelengths. In other words, the transmitter 275 and the movable portion 276 of the first modification function as a vibration amplifier that amplifies the vibration of the tuning fork 210. With such a configuration, the toner remaining amount detector 200A according to the first modification further includes the vibration amplifier in addition to the vibration generator 270 according to the above-described embodiment, and thus, the forced vibration of the tuning fork 210 by the vibration generator 270 can be further amplified. As a result, the removal of toner powder adhering to the terminals 261 of the communication circuit 260 and the electrodes 32B6 of the toner bottle 32B can be further enhanced, and thus, the communication between the communication circuit 260 and the toner bottle 32B via the terminals 261 and the electrodes 32B6 can be further appropriately prevented. The toner powder adhering to the tuning fork 210 itself can be removed more easily by the vibration of the tuning fork 210 and the amplification thereof, and thus, the toner remaining amount can be detected accurately in the image forming apparatus 100 using the toner bottle 32B.

In the first modification, when the vibration generator 270 is in a non-operating state, the first portion 275A of the transmitter 275 is lowered by the movable portion 276, and the state where the one end 275C of the transmitter 275 is not in contact with the toner bottle 32B is maintained. Such a configuration can prevent the vibration of the tuning fork 210 from being amplified except when the vibration generator 270 forcibly vibrates the tuning fork 210.

The operation of the movable portion 276 can be controlled by, for example, the vibration controller 246 of the toner remaining amount detector 200.

As illustrated in FIG. 13, it is preferable that a wave-shaped portion 275E is formed at any position in the second portion 275B of the transmitter 275 in a range between the locking portion of the tip portion 276B of the movable portion 276 and the other end 275D coupled to the tuning fork 210. The wave-shaped portion 275E is formed to be curved to protrude in one direction (downward in FIG. 13) orthogonal to the extending direction of the second portion 275B. Such a wave-shaped portion 275E is provided, so that the wave-shaped portion 275E can absorb the displacement of the height position of the locking portion of the second portion 275B with the tip portion 276B and the first portion 275A due to the up-and-down movement of the movable portion 276, and thus, stress is less likely to be applied to the tuning fork 210 and the terminals 261.

FIG. 14 is a diagram illustrating a vibration generator 270A according to a second modification of the present embodiment. The second modification illustrated in FIG. 14 is an example of a configuration in which the vibration generator 270 according to the present embodiment illustrated in FIG. 4 is replaced with another element. As illustrated in FIG. 14, the vibration generator 270A according to the second modification includes a piezoelectric element 277. The piezoelectric element 277 is disposed to contact the tuning fork 210. For example, as illustrated in FIG. 14, the piezoelectric element 277 can be disposed between the lower surface of the tuning fork 210 and the upper surface of the communication circuit 260 to maintain a contact state with the tuning fork 210.

When the vibration generator 270A according to the second modification is in the operation state, a voltage is applied to the piezoelectric element 277 and the piezoelectric element 277 vibrates, and thus, the tuning fork 210 can be forcibly vibrated. With such a configuration, the vibration generator 270A according to the second modification can also remove toner powder adhering to the terminals 261 of the communication circuit 260 and the electrodes 32B6 of the toner bottle 32B, similarly to the vibration generator 270 of the above-described embodiment, and thus, a disadvantage that the communication between the communication circuit 260 and the toner bottle 32B via the terminals 261 and the electrodes 32B6 is hindered can be appropriately prevented. The toner powder adhering to the tuning fork 210 itself is also removed by the vibration of the tuning fork 210, so that the toner remaining amount can be accurately detected in the image forming apparatus 100 using the toner bottle 32B.

The operation of the piezoelectric element 277 of the vibration generator 270A can be controlled by, for example, the vibration controller 246 of the toner remaining amount detector 200.

Note that, similarly to the first modification illustrated in FIG. 13, the vibration generator 270A according to the second modification may be combined with the transmitter 275 and the movable portion 276 as the vibration amplifier.

The embodiments of the present disclosure are described above with reference to specific examples. However, the present disclosure is not limited to the above-described specific examples. The modified specific examples including the features of the present disclosure, in which a person skilled in the art appropriately implements a design change, are also included in the scope of the present disclosure. For example, each element included in each specific example described above and the arrangement, condition, and shape thereof are not limited to the above-described specific examples and can be appropriately changed. The respective elements included in the above-described specific examples can be appropriately combined with each other unless technically contradicted.

Aspects of the present disclosure are, for example, combinations of first to sixth aspects as follows.

First Aspect

An image forming apparatus (e.g., the image forming apparatus 100) includes a toner bottle (e.g., the toner bottle 32B), an image forming device (e.g., the image forming device 6), and a toner remaining amount detector (e.g., the toner remaining amount detector 200). The toner bottle stores toner. The image forming device in which the toner stored in the toner bottle is supplied forms a toner image. The toner remaining amount detector includes a tuning fork (e.g., the tuning fork 210), a vibration detector (e.g., the vibration detector 220), and a controller (e.g., the controller 230). The tuning fork is disposed to receive a load from the toner bottle. The vibration detector detects vibration of the tuning fork by the load. The controller estimates the remaining amount of the toner based on the vibration. The toner bottle includes a substrate (e.g., the ID substrate 32B5) and electrodes (e.g., the electrode 32B6). Unique information of the toner bottle is recorded on the substrate. The electrodes are electrically connected to the substrate, are disposed on a surface of the toner bottle, and are disposed to expose outside of the toner bottle. The image forming apparatus further includes a communication device and terminals (e.g., the terminal 261). The communication device communicates with the toner bottle. The terminals are connected to the communication device and contacts the electrodes of the toner bottle to electrically connect the substrate and the communication device. The tuning fork of the toner remaining amount detector is united with the terminals to receive the load of the toner bottle via the terminals. The terminals are electrically connected to the communication device via the tuning fork. The toner remaining amount detector includes a vibration generator (e.g., the vibration generator 270) that forcibly vibrates the tuning fork.

Second Aspect

In the image forming apparatus (e.g., the image forming apparatus 100) according to the first aspect, the vibration generator (e.g., the vibration generator 270) physically strikes the tuning fork (e.g., the tuning fork 210) to forcibly vibrate the tuning fork.

Third Aspect

In the image forming apparatus (e.g., the image forming apparatus 100) according to the first or second aspect, the vibration generator (e.g., the vibration generator 270) includes a piezoelectric element disposed in contact with the tuning fork (e.g., the tuning fork 210). A voltage is applied to the piezoelectric element to vibrate the piezoelectric element. Thus, the tuning fork is forcibly vibrated.

Fourth Aspect

In the image forming apparatus (e.g., the image forming apparatus 100) according to any one of the first to third aspects, the toner remaining amount detector (e.g., the toner remaining amount detector 200) includes a transmitter (e.g., the transmitter 275) and a movable portion (e.g., the movable portion 276). One end of the transmitter is contactable with the toner bottle (e.g., the toner bottle 32B). The other end of the transmitter is coupled to the tuning fork (e.g., the tuning fork 210). A movable portion can change a distance between the one end of the transmitter and the toner bottle.

The one end of the transmitter is contacted with the toner bottle by the movable portion so that the vibration of the tuning fork generated by the vibration generator (e.g., the vibration generator 270) is amplified with a specified wavelength.

Fifth Aspect

In the image forming apparatus (e.g., the image forming apparatus 100) according to any one of the first to fourth aspects, the vibration generator (e.g., the vibration generator 270) operates to forcibly vibrate the tuning fork (e.g., the tuning fork 210) before the communication device communicates with the toner bottle (e.g., the toner bottle 32B).

Sixth Aspect

In the image forming apparatus (e.g., the image forming apparatus 100) according to any one of the first to fifth aspects, the vibration generator (e.g., the vibration generator 270) operates to forcibly vibrate the tuning fork (e.g., the tuning fork 210) when an error occurs in communication between the communication device and the toner bottle (e.g., the toner bottle 32B). The communication device communicates with the toner bottle again after the vibration generator operates.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An image forming apparatus comprising:

a toner container housing to house a toner bottle storing toner, the toner bottle including an electrode on a surface of the toner bottle;

an image forming device to receive the toner in the toner bottle to form a toner image;

a tuning fork;

a vibration generator to vibrate the tuning fork;

a communication circuit electrically connected to the tuning fork; and a terminal coupled to the tuning fork and contactable with the electrode to electrically connect the communication circuit and the electrode of the toner bottle in the toner container housing via the tuning fork, wherein the vibration generator vibrates the tuning fork to vibrate the terminal contacting the electrode.

2. The image forming apparatus according to claim 1, further comprising:

a vibration detector to detect a vibration of the tuning fork; and circuitry configured to estimate an amount of toner remaining in the toner bottle based on the vibration detected by the vibration detector.

3. The image forming apparatus according to claim 1, wherein the tuning fork receives a load of the toner bottle via the terminal.

4. The image forming apparatus according to claim 1, wherein the vibration generator physically strikes the tuning fork to vibrate the tuning fork.

5. The image forming apparatus according to claim 1, wherein the vibration generator includes a piezoelectric element to:

contact the tuning fork; and generate a vibration to vibrate the tuning fork.

6. The image forming apparatus according to claim 1, further comprising:

a transmitter having:

one end contactable with the toner bottle; and another end coupled to the tuning fork; and a movable portion to change a distance between the one end of the transmitter and the toner bottle, wherein the movable portion causes the one end of the transmitter to contact the toner bottle to amplify a vibration of the tuning fork with a specified wavelength.

7. The image forming apparatus according to claim 2, wherein the circuitry is further configured to cause the vibration generator to vibrate the tuning fork before the communication circuit communicates with the electrode of the toner bottle via the tuning fork and the terminal.

8. The image forming apparatus according to claim 2, wherein the circuitry is further configured to:

detect a communication error between the communication circuit and the electrode of the toner bottle;

cause the vibration generator to vibrate the tuning fork in response to a detection of the communication error; and cause the communication circuit to communicate with the electrode of the toner bottle again after a vibration of the tuning fork by the vibration generator.

* * * * *